(12) United States Patent
Kwatra et al.

(10) Patent No.: US 11,734,030 B2
(45) Date of Patent: Aug. 22, 2023

(54) CLASSIFICATION AND VISUALIZATION OF USER INTERACTIONS WITH AN INTERACTIVE COMPUTING PLATFORM

(71) Applicant: INTERNATIONAL BUSINESS MACHINES CORPORATION, Armonk, NY (US)

(72) Inventors: Shikhar Kwatra, San Jose, CA (US); Smitkumar Narotambhai Marvaniya, Bangalore (IN); Caleb Miles, Columbia, MO (US); Clement Decrop, Arlington, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/935,390

(22) Filed: Sep. 26, 2022

(65) Prior Publication Data
US 2023/0153129 A1    May 18, 2023

Related U.S. Application Data

(63) Continuation of application No. 17/455,063, filed on Nov. 16, 2021, now Pat. No. 11,513,822.

(51) Int. Cl.
*G06F 3/0482* (2013.01)
*G06F 9/451* (2018.01)
(Continued)

(52) U.S. Cl.
CPC ............ *G06F 9/451* (2018.02); *G06F 3/0482* (2013.01); *G06F 3/04847* (2013.01); *G06N 20/00* (2019.01); *G09B 7/04* (2013.01)

(58) Field of Classification Search
CPC .... G06F 9/451; G06F 3/0482; G06F 3/04887; G06N 20/00; G09B 7/04
See application file for complete search history.

(56) References Cited

U.S. PATENT DOCUMENTS 6,186,794 B1   2/2001  Brown et al.
7,165,105 B2   1/2007  Reiner et al.
(Continued)

FOREIGN PATENT DOCUMENTS

WO     2004075015 A2    9/2004

OTHER PUBLICATIONS

Innes, "Development and evaluation of a self-instruction method for analysing spatial information." Diss. (2009), 3 pgs. Retrieved on Oct. 13, 2021 from Internet URL: https://open.uct.ac.za/handle/11427/11872.

(Continued)

*Primary Examiner* — Anil K Bhargava
(74) *Attorney, Agent, or Firm* — Rakesh Roy; Matthew M. Hulihan; Heslin Rothenberg Farley & Mesiti PC

(57) ABSTRACT

Classification and visualization of user interactions with an interactive computing platform is provided by building and providing a graphical user interface (GUI) of graphical elements for display on a display device. The graphical elements present (i) visualizations of user interactions between users and an interactive computing platform in progression of the users through tasks based on the user interactions and (ii) identified features of the user interactions relative to the tasks and progression of the users therethrough. The building and providing includes, for each of the tasks, building and providing a respective task element that reflects identified features of a set of user interactions of one or more users in progressing through that task. Building a task element for a task includes building the task (Continued)

element as a polygon having vertices corresponding to subtasks of the task and edges between the vertices.

19 Claims, 17 Drawing Sheets

(51) Int. Cl.
*G06F 3/04847* (2022.01)
*G09B 7/04* (2006.01)
*G06N 20/00* (2019.01)

(56) References Cited

U.S. PATENT DOCUMENTS

| | | | |
|---|---|---|---|
| 8,412,736 | B1 | 4/2013 | Arnold et al. |
| 9,419,868 | B1 | 8/2016 | Koerner |
| 9,459,766 | B1 | 10/2016 | Haynes et al. |
| 9,535,564 | B2 | 1/2017 | De Armas et al. |
| 10,038,731 | B2* | 7/2018 | Pearl ............... G06F 16/11 |
| 10,643,157 | B2* | 5/2020 | De ............... G06Q 10/063114 |
| 11,112,950 | B2* | 9/2021 | Srivastava ............ A61B 5/0002 |
| 11,175,816 | B2* | 11/2021 | Haramati ............. G06Q 10/103 |
| 11,361,156 | B2* | 6/2022 | Mann ............ G06Q 10/063114 |
| 2004/0202987 | A1* | 10/2004 | Scheuring ............... G09B 7/04 434/118 |
| 2013/0052628 | A1 | 2/2013 | Srinivas et al. |
| 2014/0227675 | A1 | 8/2014 | Budhu |
| 2015/0254594 | A1 | 9/2015 | Kittur et al. |
| 2015/0287339 | A1* | 10/2015 | Deshmukh ............. G09B 19/04 434/156 |
| 2016/0224928 | A1* | 8/2016 | De ............... G06Q 10/063114 |
| 2017/0193620 | A1 | 7/2017 | Chatow et al. |
| 2018/0096619 | A1 | 4/2018 | Fuka |
| 2018/0239959 | A1* | 8/2018 | Bui ............... G06F 3/0482 |
| 2019/0261908 | A1* | 8/2019 | Alailima ............... A61B 5/7405 |
| 2019/0361579 | A1* | 11/2019 | Srivastava ............. G06F 9/451 |
| 2020/0402643 | A1* | 12/2020 | Trees ............... G16H 10/20 |
| 2021/0149925 | A1* | 5/2021 | Mann ............... G06Q 10/0633 |
| 2021/0374610 | A1* | 12/2021 | Dirac ............... G06N 20/00 |
| 2021/0374619 | A1* | 12/2021 | Wolfe ............... G06Q 40/03 |

OTHER PUBLICATIONS

Roto, et al., "User Experience Evaluation Methods in Academic and Industrial Contexts." (2009), 5 pgs.

Hegarty, et al., "Thinking about the weather: How display salience and knowledge affect performance in a graphic inference task." Journal of Experimental Psychology: Learning, Memory, and Cognition 36.1 (2010): 37, 17 pgs.

Capraro, et al., "Investigating the Complexity of Middle Grade Students' Understandings of Mathematical Constructs: An Example from Graphic Representation." (2002), 36 pgs.

Mell, et al., "The NIST Definition of Cloud Computing", NIST Special Publication 800-145, Sep. 2011, Gaithersburg, MD, 7 pgs.

"O'Reilly ebook: Getting Started with Artificial Intelligence", 7 pgs. Retrieved on Oct. 13, 2021 from Internet URL: https://www.ibm.com/developerworks/library/cc-smarter-wearables-healthcare-concepts/index.html.

"What is a chatbot", IBM, 11 pgs. Retrieved on Oct. 13, 2021 from Internet URL: https://www.ibm.com/cloud/learn/chatbots-explained.

"Watson Assistant: Intelligent Virtual Agent", IBM, 12 pgs. Retrieved on Oct. 13, 2021 from Internet URL: https://www.ibm.com/cloud/watson-assistant.

Vaananen-Vainio-Mattila, et al., "A Tool for Evaluating Service User experience (ServUX)—Development of a Modular Questionnaire", Semantic Scholar, 2009, 6 pgs. Retrieved on Oct. 13, 2021 from Internet URL: https://www.semanticscholar.org/paper/A-Tool-for-Evaluating-Service-User-eXperience-(-)-%3A-V%C3%A4%C3%A4n%C3%A4nen-Vainio-Mallila/7c27714a10c8b11795fc067bd8cc5eb99b5aa920#citing-papers.

"The Hive", IBM A/NZ Blog, IBM, 5 pgs. Retrieved on Oct. 13, 2021 from Internet URL: https://www.ibm.com/blogs/ibm-anz/.

Markiewicz, et al., "Getting Started with Artificial Intelligence", O'Reilly, 2d ed., 2020, 85 pgs.

List of IBM Patents or Applications Treated as Related, dated Sep. 23, 2022, 2 pgs.

"Classification and Visualization of User Interactions With an Interactive Computing Platform", U.S. Appl. No. 17/455,063, filed Nov. 16, 2021, pp. 1-72.

* cited by examiner

CLASSIFICATION AND VISUALIZATION OF USER INTERACTIONS WITH AN INTERACTIVE COMPUTING PLATFORM

BACKGROUND

Consumer devices, including computing devices such as workstations, smartphones, and tablets, and other devices like telephone systems, provide facilities for human users to interact with computer-based, artificial intelligence (AI) agents referred to as chat bots, virtual assistants, or digital assistants (collectively referred to herein as "chat agents") for any of a variety of tasks. User interactions—communications with the chat agent that are spoken, typed, or input by a user some other way—are usually transmitted over a network, such as the Internet, for backend processing. In many situations, this includes language processing, recognition of meanings and intents, and response formulation using AI. Typically the chat agent responds, and the conversation (chat) with the user may continue.

SUMMARY

Shortcomings of the prior art are overcome and additional advantages are provided through the provision of a computer-implemented method. The method builds and provides a graphical user interface (GUI) of graphical elements for display on a display device. The graphical elements present (i) visualizations of user interactions between users and an interactive computing platform in progression of the users through tasks based on the user interactions and (ii) identified features of the user interactions relative to the tasks and progression of the users therethrough. The building and providing includes, for each of the tasks, building and providing a respective task element that reflects identified features of a set of user interactions of one or more users in progressing through that task. Building a task element for a task includes building the task element as a polygon having vertices corresponding to subtasks of the task and edges between the vertices.

Further, a computer system is provided that includes a memory and a processor in communication with the memory, wherein the computer system is configured to perform a method. The method builds and provides a graphical user interface (GUI) of graphical elements for display on a display device. The graphical elements present (i) visualizations of user interactions between users and an interactive computing platform in progression of the users through tasks based on the user interactions and (ii) identified features of the user interactions relative to the tasks and progression of the users therethrough. The building and providing includes, for each of the tasks, building and providing a respective task element that reflects identified features of a set of user interactions of one or more users in progressing through that task. Building a task element for a task includes building the task element as a polygon having vertices corresponding to subtasks of the task and edges between the vertices.

Yet further, a computer program product including a computer readable storage medium readable by a processing circuit and storing instructions for execution by the processing circuit is provided for performing a method. The method builds and provides a graphical user interface (GUI) of graphical elements for display on a display device. The graphical elements present (i) visualizations of user interactions between users and an interactive computing platform in progression of the users through tasks based on the user interactions and (ii) identified features of the user interactions relative to the tasks and progression of the users therethrough. The building and providing includes, for each of the tasks, building and providing a respective task element that reflects identified features of a set of user interactions of one or more users in progressing through that task. Building a task element for a task includes building the task element as a polygon having vertices corresponding to subtasks of the task and edges between the vertices.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
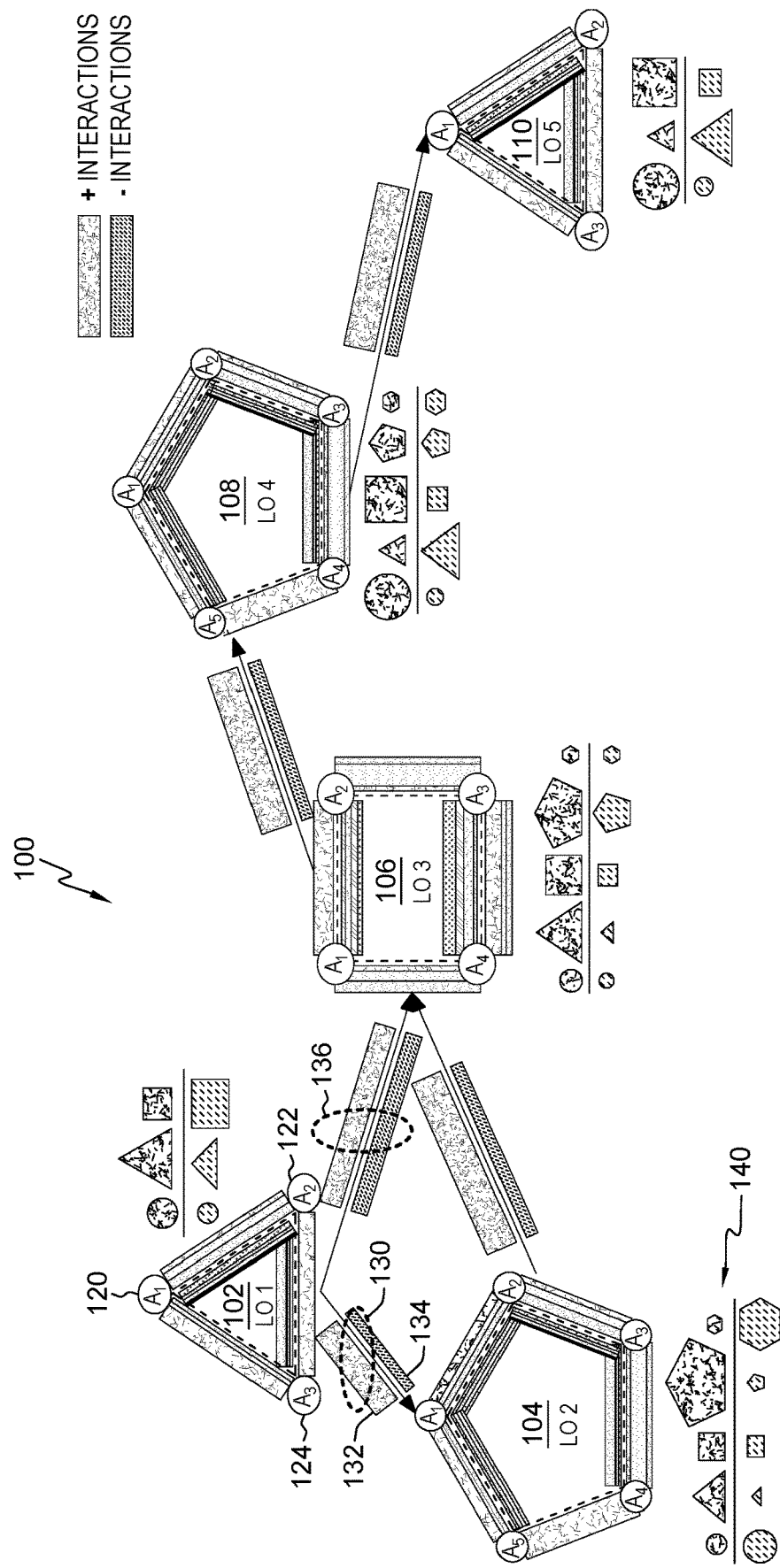
FIG. 1 depicts an example task-interaction flow, in accordance with aspects described herein.

Described herein are computer-based approaches for interpreting and graphically presenting details of user transcripts, referring to interactions (communications) between users and AI "chat agents". In particular, interactions between users and chat agents are presented for visualization and insight extraction. Some examples described or presented herein involve chat agents used primarily to progress users through learning objectives that assist the users in learning various concepts. This is by way of example only, and aspects described herein apply more broadly to chat agents of any type including those in which users progress through tasks, activities, assessments, or the like, or receive assistance from the chat agent for troubleshooting or other purposes. Users can interact with a chat agent individually and/or in groups, and user transcript(s) of the interactions can be captured. In examples, each user interacts with the chat agent individually and a transcript of that interaction is produced and provides the interactions of both the user and the chat agent. In examples, the user transcript can be generated, produced, transmitted, stored, etc. in real time as the chat session progresses. User transcript analysis and other processing as described herein can occur in real time as the chat session proceeds and/or at a later time after the chat session has ended.

Proposed in some aspects is a framework for visualizing user transcripts, and, as noted, these could be transcripts of completed conversations and/or conversations in-progress at runtime of processes discussed herein. Further, the conversations could be text/written conversations or audio conversations, such as conversations made over a telephone. The user transcripts that provide the interactions between the user and chat agent can be provided in text or audio format. The framework can automatically learn features from the transcripts for visualization, ascertain various attributes of the user's interactions, such as emotions expressed by the user, 'correct' and 'incorrect' responses provided by the user, and levels of user engagement. The framework can automatically learn and identify conversation features to graphically present for visualization, such features including session duration, numbers of terms, or concepts expressed, as examples. Aspects can also automatically identify tasks and subtasks of those tasks to inform multiple levels of detail for selection and visualization by other subject matter experts (SMEs), as well as the paths that users take between tasks and subtasks when interacting with the chat agent. Also provided are approaches to visualize peer and individual interaction information within a single visualization with the distribution of aforementioned features. As described in further detail below, aspects provide visualization of (i) tasks and subtasks as polygons with distribution of features, (ii) traversal between tasks/subtasks as edges/paths, with the distribution of successful and unsuccessful tasks/subtasks (e.g. learning sessions) captured as edges, (iii) peer information in the distribution of categories of features using different graphical patterns/colors, (iv) subsets of features, tasks, and subtasks to specifically analyze certain user experiences/interactions, and (v) features for individual users or group of users, such as peers.

Existing approaches for user interaction analysis do not provide for visualization of user chat transcripts in the context of the user understanding, experience, and progression through tasks and subtasks. They also do not possess intelligence to generate visual representations of user transcripts and associated activities that can help improve user experiences.

Visual representation of transcripts as described herein gives detailed information about how users progressed or are currently progressing at runtime and helps in identifying content improvements to improve user experience and learning objectives. It can also enable users to visualize how they progress relative to friends, classmates, peers, or other groupings of users.

A proposed framework for visualizing user interactions in real-time or post hoc according to varying features can assist in teaching activities and other learning objectives to students (users), and the teacher can customize which parameters are used in the visualization of user interactions. Example functionality enables:

- the teacher to monitor run-time user interactions between students and the chat agent through a visual representation tool (user interface);
- the teacher to identify learning objectives, subtasks, and content that result in successful and unsuccessful user engagement, to potentially emphasize or improve such items, for instance to identify acceptable variants of expected responses (student answers to questions, for instance) or develop hints for helping to progress students through learning objectives;
- individual users and the teacher to visualize how are they progressing relative to friends or peers. Group or social activities can be planned for those peers who are academically near each other;
- the teacher to identify the most successful paths for user progress through tasks and subtasks;
- the teacher to track the information and interaction flows both within a task (between the subtasks thereof) and between tasks;
- the teacher to guide interactions to provide social learning and live tutoring to users who are nearest each other in terms of progression through the tasks; and
- the teacher to view a graph of user progression for individuals or groups of students and can query a sub-graph for details of users.

Conventional approaches fail to provide these and other features described herein.

The following presents an example partial user transcript with interactions labeled 1-9 between a user (U) and a chat agent (CA):

1. CA: I'm your digital tutor! I'll chat with you and ask questions about the material from your readings to help improve your understanding. You can ask me questions about this topic, leave me feedback, or check your progress at any time. Remember, I'm learning too. Your responses are making me a better tutor. Let's get started. Try answering this question: What impact do family relationships have on adult development during middle adulthood?
2. U: Birth of first grandchild, empty-nest syndrome, generativity vs. stagnation, health concerns.
3. CA: That looks partly correct. There is a little more to the answer.
4. U: I am not sure. Can you tell me exactly what you are looking for?
5. CA: Changing roles with children impact changes in the way parents interactions in middle adulthood.
6. U: You don't understand me. I gave the correct answer.
7. CA: Thank you for your feedback. Let's look at this from a slightly different angle. How do the senses function during late adulthood?

8. U: I have one question: Can you help me in differentiating senses with physical changes?

9. CA: Can you group the following concepts: Height Vision Weight Hearing Taste Smell Here, the chat agent asks the user questions, guides the user in completing answers, provides hints and feedback, completes thoughts, provides further details, and recognizes emotions during the interactions. Specifically in this transcript the chat agent asked a question (1), the user provided an initial answer (2), the chat agent indicates that the initial answer was party correct and prompts the user to expand on the answer (3), then the user indicates lack of understanding and asks the chat agent to be more specific as to the prompt (4), and the chat agent responds by providing a hint in the form of a fill-in-the-blank (FITB) statement (5). The transcript progresses (not shown in the above) and the user eventually expresses some negativity (6), to which the chat agent responds acknowledging the feedback and rephrasing a question for the user to answer (7). The user asks a question about a related (or perhaps unrelated) concept (8) and the chat agent responds by prompting the user to perform a concept grouping (9).

AI/machine learning models/classifiers can be applied to transcripts, such as the example above, to determine/predict/classify features therefrom that can be used in building a visualization interface for visualizing this and other user transcripts. For instance, classifier(s) could classify interaction 4 as the user expressing confusion and requesting the chat agent to provide a hint, interaction 6 as evincing a negative interaction, and interaction 8 as requesting a concept grouping hint from the chat agent, all of which might be useful features for a visualization interface as described herein.

Example categories of transcript visualization features discussed herein are emotions, misconceptions, hint types, interactions types, and user performance. Classification (also referred to as prediction or estimation) of features can be performed by one or more classifier(s)/detector(s). In an example, each category of transcript feature is associated with its own classifier to predict features in that category.

An example emotion classifier classifies emotions of interactions into classes that can include, as examples: fear, anger, joy, surprise, disgust, and other.

An example misconception detector is a binary classifier that classifies a user's conception about something as yes (for misconception) or no (for proper conception).

An example hint type classifier classifies types of hints provided by the CA in the interactions, the hint types including, as examples: textual hint, visual hint (e.g. a picture or graphic), fill-in-the-blank (FITB) hint, concept grouping, or other.

An example interaction type classifier classifies interactions into classes such as positive interactions, negative interactions, or neutral interactions, as examples An example user performance classifier classifies user performance (on a task or subtask, for instance) into classes that include, as examples: excellent, very good, good, poor, and very poor.

In this specific example, a process can train five different types of classifiers for classifying different feature types, including emotions, misconceptions, hint types (e.g. hints that might have been prompted from user interactions), interaction types, and user performance from user transcripts. In examples, the classifiers are trained by supervised learning in which annotated transcripts—ones with interactions labeled with the proper feature classes to be taken as ground truths—are used to train the classifiers to properly classify transcript interactions along any or all of the 5 categories noted above.

In applying the classifiers, each user response of each such transcript can be potentially classified across all five feature types using the respective five different classifiers. Thus, based on the user transcripts, the system can detect these features to inform the transcript visualization features that are presented in a visualization interface.

Various figures discussed herein include visually patterned elements in which the different patterns reflect different categories, types, groups, attributes, or the like. It is understood that interface elements can be provided with any kind of features that provide visually distinctions, such as different colors, patterns, highlights, or the like.

Figure 4:
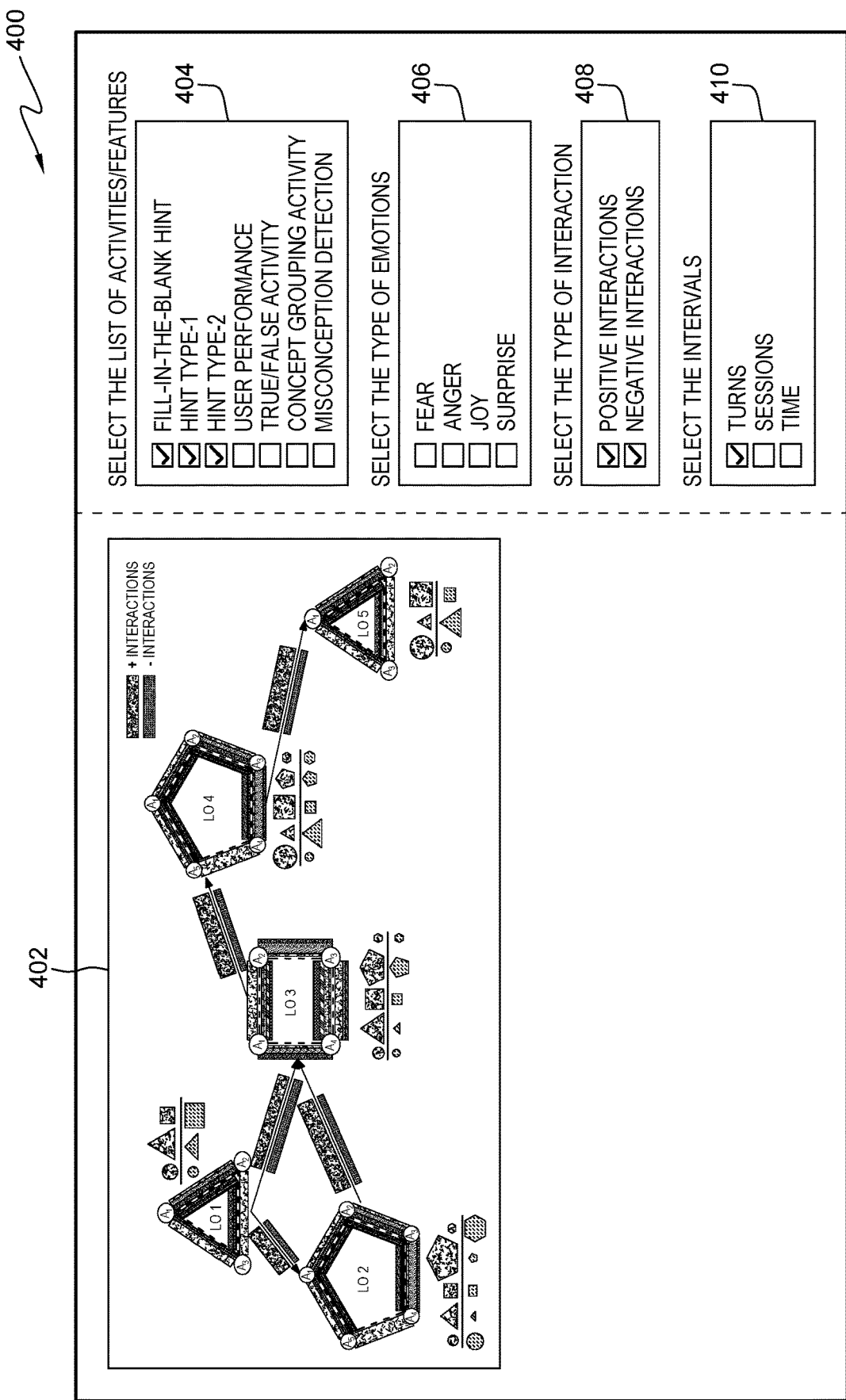
FIG. 4 depicts an example visualization interface for visualizing user transcripts, in accordance with aspects described herein.

FIG. 1 depicts an example task-interaction flow in accordance with aspects described herein. The task-interaction flow can be built and presented as part of a visualization interface as depicted in FIG. 4.

The task-interaction flow 100 helps users (teachers, instructors, or other subject-matter experts (SMEs), which are themselves users of a system described herein but may typically be other users than the users whose transcripts are analyzed to build the task-interaction flow) visualize user interactions with chat agent(s). From a task-interaction flow, the SME can conveniently identify various attributes of user interactions particularly as they relate to tasks/subtasks through which the users progress in interacting with the chat agent.

The task-interaction flow 100 of FIG. 1 shows a visualization of interactions from a collection of user transcripts of interactions of different users with the chat agent, in which users progress through five tasks (termed "LO"s for learning objectives in FIG. 1). It may be that only some of the users progressed through all five tasks and some other users did not progress through all five tasks. For instance, some users may be in the process of progressing through all five tasks and their transcripts are only partially complete in that regard. The visualization could incorporate the interactions of those users up to their current point of interaction.

The five tasks are represented by five task elements 102, 104, 106, 108 and 110. Each such task element is a polygon with sides/edges connecting to vertices/nodes. The number of nodes corresponds to how many subtasks exist for the task. For instance, the first LO/task, LO1, is represented by task element 102 and includes three subtasks labeled A1 (120), A2 (122), and A3 (124), each indicated as a node of task element 102. As a specific example, each subtask correlates to an activity, for instance presentation of a question by the chat agent and receipt of a correct response to the question by the user. Correctly completing one activity (e.g. correctly answering the question of a subtask), such as A1, will progress the user to the next activity, A2 in this example.

An edge from one subtask to a sequentially-next subtask is constructed of elements that reflect the types of user interactions, classified from the user transcripts, when users interacted with the chat agent in working on progressing from the one subtask to the sequentially-next subtask. For instance, the edge between A1 and A2 of task element 102 reflects user interactions with the chat agent when working to complete subtask A1 in order to progress to subtask A2. The edge connecting the sequentially-last subtask of a task to the first subtask of the task—the edge connecting A3 to A1 in task element 102, for instance—represents user interactions in working to complete the last subtask (subtask A3) of the task (LO1) before progressing to a next task (LO2).

Further details of task elements and what they reflect are discussed below with reference to FIG. 2.

The users progress through tasks as reflected in the task-interaction flow using inter-task progression indicators, an example of which is indicator 130. Inter-task progression indicator 130 includes an arrow connecting task element 102 to task element 104 for LO2, reflecting that at least some users progressed from LO1 to LO. The arrow is flanked by first and second indicators (bars) 132, 134 reflective of a magnitude of positive and negative interaction types, respectively, that users had in progressing between the two tasks. The thickness of an indicator of an inter-task progression indicator is reflective of the proportion of users with that interaction type. For instance, indicator 132 reflects the magnitude (e.g. portion or number) of positive interactions in progressing from LO1 to LO2, while indicator 134 reflects the magnitude of negative interactions in progressing from LO1 to LO2. The indicator 130 is configured here to visually indicate that the majority of users who progressed from LO1 to LO2 had a positive interaction experience in progressing from LO1 to LO2, because indicator bar 132 is thicker than indicator bar 134. The thickness can be proportional to the magnitude.

The inter-task progression indicators between task elements can reflect the effectiveness of progressing a user from one task to the sequentially-next task, i.e. how well users performed in the next task after progressing from the prior task. In the example of indicator 130, most interactions were positive, reflecting a generally positive experience of users in progressing through LO2 after progressing to LO2 from LO1. Similarly, the interactions when progressing to LO3 from LO2 were also significantly positive. In contrast, inter-task progression indicator 136 indicates that a proportionally larger number of users had a negative experience when progressing directly to LO3 from LO1 in comparison to the users who progressed to LO3 from LO2. The inter-task progression indicator between one task and a sequentially-next task can be determined based on user experiences as they progress through the sequentially-next task. Actions of users to cancel out of a learning session between the two tasks might contribute as negative interaction between the two tasks.

Next to each of the task elements 102, 104, 106, 108, 110 is a respective interval indicator showing two sets of polygons using two different patterns. The interval indicator for task LO2 (104) is indicator 140 in this example. An interval indicator for a task depicts interval information of users progressing through the task, the interval being a measure of some property of users' progression through the task. Example such properties include a number or duration of turns, sessions, or time taken (as examples) for the users to progress through the task. Further details of an interval indicator are described with reference to FIG. 3.

Figure 2:
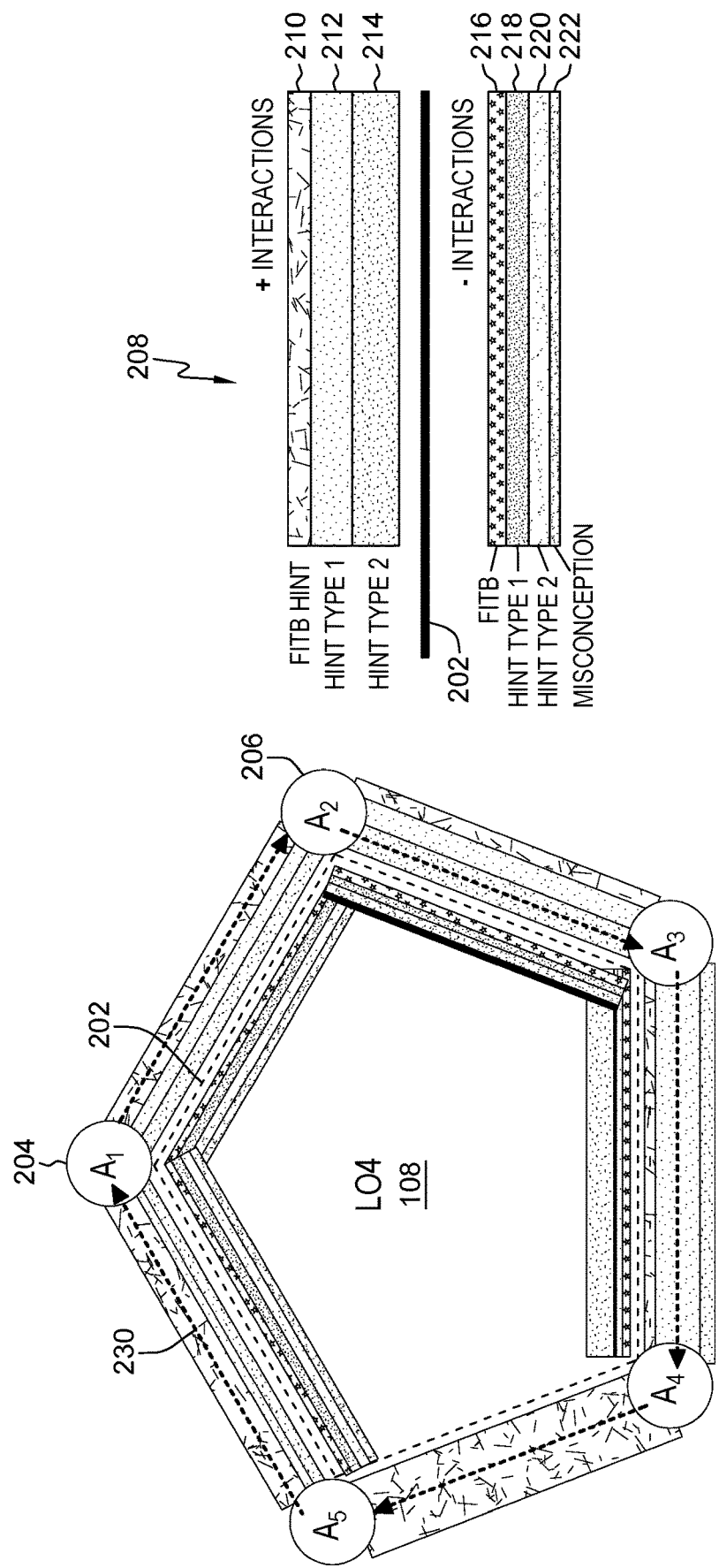
FIG. 2 depicts further details of a task element, in accordance with aspects described herein.

FIG. 2 depicts further details of a task element in accordance with aspects described herein. Specifically, details of task element 108 (FIG. 1) for LO 4 are depicted by FIG. 2. Task LO4 includes five subtasks, A1, A2, A3, A4 and A5 with correspondingly labeled nodes of task element 108. After completing subtask A5, the user progresses to LO 5 in the example of FIG. 1. The task element 108 provides a visualization of user interactions in progressing through the task LO4.

Task LO4 includes five subtasks and therefore task element 108 is a polygon—a five-sided pentagon with five vertices in this example—to reflect the five subtasks of LO4. Each vertex of the polygon corresponds to a subtask. As noted, an edge of the polygon from one subtask to a sequentially-next subtask indicates features of user interactions of users performing/completing the one subtask in order to progress to the sequentially-next subtask. Thus, the user interactions in completing subtask A1 to progress to subtask A2 are captured along the edge between nodes 204 and 206 corresponding, respectively, to subtasks A1 and A2. An example A1 is a question presented to the user by the chat agent and A2 is a question presented to the user after subtask A1, for instance if the user correctly answered the question presented in A1.

The edge between subtasks A1 and A2 is constructed of an edge line 202 and interaction indicators, bars in this example, indicating user interaction types that were classified from the user transcripts when users interacted with the chat agent in working to progress from subtask A1 to the sequentially-next subtask A2. The interaction indicators show aggregate user interactions by interaction type. Additionally, some interactions are considered positive and some are negative. In this example, interaction indicators reflecting negative interactions are positioned on the side of the edge line 202 that is at the interior/inside of the polygon, while interaction indicators reflecting positive interactions are positioned on the side of the edge line 202 that is at the exterior/outside of the polygon.

208 of FIG. 2 presents a detailed view of the interaction indicators of the edge between subtasks A1 and A2 (nodes 204, 206). The detailed view could be presented in an interface based on the SME selecting the edge between the two subtasks, for instance. Additionally or alternatively, a legend or key could be provided showing the interaction type labels (FITB, Hint Type 1, etc.) and the respective pattern, color, highlight, etc. that is used to correspond to that interaction type.

In the detailed edge view 208, three interaction indicators 210, 212, 214 corresponding to FITB hint, Hint type 1, and Hint type 2, respectively, are positioned above edge line 202 (corresponding to outside of the polygon). Each interaction indicator corresponds to a respective hint type. The chat agent may have given the same hint or a different hint of that type to some/all users to aid in their progression from 204 to 206. Below edge line 202 (corresponding to the inside of the polygon) are four interaction indicators 216, 218, 220, 222 corresponding to FITB hint, Hint type 1, Hint type 2, and misconceptions, respectively. The interactions reflected in indicators 210, 212, 214 above edge line 202 reflect positive interactions with the chat agent, while the interactions reflected in indicators 216, 218, 220, 222 below edge line 202 reflect negative interactions with the chat agent. It is noted that classified interactions for some feature types (e.g. hints in this example) could be either positive or negative interactions depending on the context, wording, and other characteristics of the interaction. Thus, taking the example of the FITB hint, a user's interaction relative to a FITB hint might be a positive interaction or a negative interaction. An example positive interaction might be the case when the user provided the correct word/phrase to appear in the blank, whereas a negative interaction might be the case when the user provided a grossly inaccurate word/phrase to fill in the blank. Similarly, interactions of other hint types could be classified as positive or negative. Interactions reflecting misconceptions (element 222) might typically always be a negative interaction.

The thickness of an interaction indicator (210, 212, 214, 216, 218, 220, 222) is proportional to the number of user interactions classified into that interaction type. As reflected by 208, positive hint type 2 interactions were most frequent at this point in task completion, followed by positive hint type 1 interactions, and so on. In examples, a user presented with this visualization of the task could hover a pointer over an interaction indicator and the interface will update to present statistical data about the user interactions of the corresponding interaction type and/or other interaction types (frequency, percentage, raw number of users with that type of interaction, etc.).

One or more user interactions to progress from one subtask to a next subtask can be reflected in one or more of the interaction indicators along an edge between them. As an example, a user may have interacted such that two hints of different types were needed to progress the user to the next subtask. In this case, the user interactions could be reflected/contribute to the interaction indicators of both hint types (e.g. 212, 218), or just the hint type of the hint that was successful in soliciting the user's correct response (e.g. 212) to progress to the next subtask. The user might initially provide an incorrect answer to the question presented by the chat agent, receive a Hint Type 1 from the chat agent and provide a second incorrect answer, then receive a FITB hint from the chat agent and provide the correct answer. This might progress the user to the next subtask and result in multiple interactions being reflected along the edge between the subtasks. For instance, these might be reflected in a negative interaction of Hint Type 1 and a positive interaction of FITB because that is the hint type that solicited the correct answer, or these might be reflected in just a positive interaction of FITB.

In another example, two or more user statements/interactions might, in the aggregate, reflect a single interaction type, for instance where a user provides two statements that together reflect a misconception of a concept. The two interactions could be captured as a single unit in the misconception interaction indicator 222. In yet another situation, a single interaction could be reflected as multiple different interaction types. An example of this is a negative interaction relative to a FITB hint that also reflects a misconception, in which case the interaction could be captured in both the negative FITB interaction indicator 216 and the misconception indicator 222. Alternatively, the interaction could be captured in a selected one of the two indicators, or in yet a different interaction indicator that is more detailed and reflect interactions that are both (i) negative FITB interactions and (ii) misconceptions.

It is noted that there were no negative interactions in users progressing from subtask A4 to subtask A5 in this example, and all of the interactions were positive FITB hint type interactions.

In cases when the interface presents an interaction indicator for user performance, which is one of the transcript visualization feature categories discussed above, an interaction indicator for positive user performance interactions could encompass the Good, Very Good, and Excellent user performance classes, while a user interaction indicator for negative user performance interactions could encompass the Poor and Very Poor user performance classes.

It may be possible for a user to provide a correct response/answer and successfully progress from one subtask to the next yet do so by way of one or more negative interactions. This might occur in a situation where a user expresses a correct answer but in a negative manner, for instance one marked by frustration.

It is also noted that the system could progress a user from one subtask (or task) to another even if the user did not provide the expected or 'correct' expression. This might be done when a user expresses a misconception as a negative interaction but the user has demonstrated competency in that concept in another subtask/task or a later learning objective is expected to correct the misconception, as examples.

A task element could additionally or alternatively be presented in a horizontal or linear fashion in which subtasks are depicted sequentially and the appropriate interaction indicators are disposed between sequential subtasks in a manner similar to how the detailed edge view depicts interactions between subtask A1 and subtask A2.

Referring again to task element 208 in FIG. 2, the progress of any selected or specific user through the task and interactions with the chat agent in so doing can be reflected by a dashed line 230 connecting subtask nodes A1, A2, A3, A4, A5. The dashed line 230 travels though the interaction indicators corresponding to the types of interactions that user had in progressing through the task, as shown. Here, the user progressed from A1 to A2 via a FITB hint, from A2 to A3 via a Hint type 2, A3 to 4 via a Hint type 1, A4 to A5 via a FITB hint, and A5 to the next task via a FITB hint as reflected by the dashed line 230.

Figure 3:
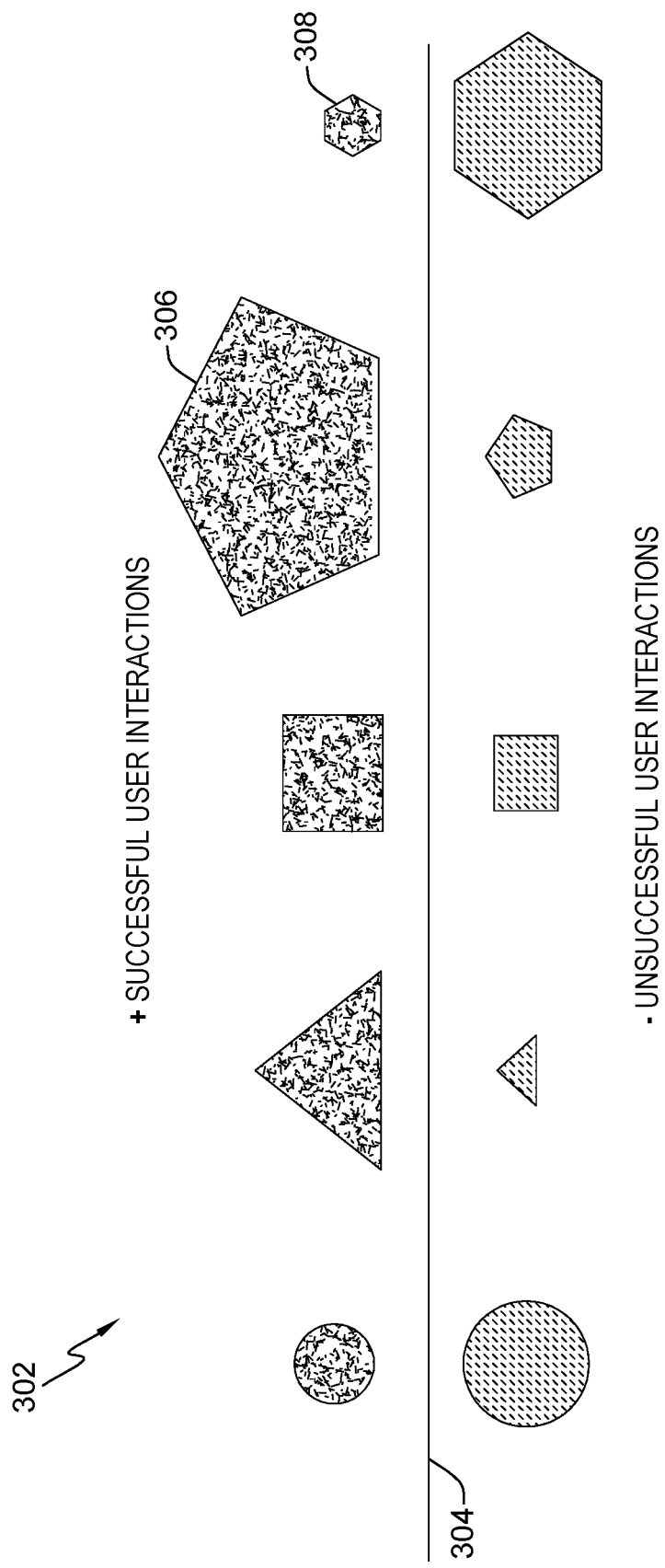
FIG. 3 depict an example interval indicator, in accordance with aspects described herein.

FIG. 3 depicts an example interval indicator in accordance with aspects described herein. The example interval indicator 302 of FIG. 3 corresponds to the interval indicator for task LO3 of FIG. 1. An interval indicator provides a visualization of successful (above line 304) and unsuccessful (below line 304) interactions with respect to a selected interval and uses polygons of varying sizes. Interval refers to a number or magnitude of some measurable property of user interactions in progressing through the task. Example intervals include, but are not limited to, turns, sessions, and time spent. A turns interval reflects a number of turns taken by the user to progress through the task. A turn could be an attempt or interaction by the user to complete a subtask, for instance to provide a correct or acceptable response to the chat agent. The total number of the user's turns taken to progress as far as the user has through the subtasks can be summed to provide the interval for that user. Similarly, a sessions interval reflects a number of sessions taken by the user to progress as far as the user has through the subtasks. A session refers to a discrete and continuous duration of time in which the user is engaged with the chat agent to work on progressing through the task, and has a beginning defined by the user opening or logging into software of which the chat agent is a part and an ending defined by some stop to the session, for instance the user completing the task in a single session, the user logging out, closing the browser, or otherwise timing-out of the session. A time taken interval reflects a total amount of time taken by the user to progress as far as the user has through the subtasks, and is, for instance, a sum of the time of each session the user has with the chat agent.

The number of sides to the polygon reflects a magnitude of whatever interval is being indicated and whatever unit is used to reflect the interval. The number of sides might correspond to a number of turns, a number of sessions, or a number of minutes, as examples. In other examples, the unit used to reflect the interval may be some multiple of the interval, such as 5 minutes. By way of specific, a polygon side could represent 5 minutes, in which case a circle (deemed a one-sided polygon for purposes of this disclosure) could represent users spending from zero to 5 minutes on the task, a line (to represent a two-sided polygon) could represent users spending more than 5 and up to 10 minutes on the task, a triangle could represent users spending more than 10 and up to 15 minutes on the task, a square could represent users spending more than 15 and up to 20 minutes on the task, etc.

The size of a polygon is proportional to the number of users with interactions falling into that interval. Using the example of FIG. 3 in which the number of sides to the polygon corresponds to time (in minutes) spent by the users, the majority of users with successful user interactions spent more than 4 and up to 5 minutes, as reflected by the size of the pentagon 306 relative to the other polygons above line 304. Hexagon 308 is smallest of the polygons above line 304, which reflects that of the users with successful interactions in this task, the fewest number of users spent more than 5 and up to 6 minutes on the task. Additionally, no users spent between 1 and 2 minutes because there are only 1, 3, 4, 5, and 6-sided polygons reflected, and no user spent 6 minutes or more on this task.

In examples, successful and unsuccessful interactions can be a function of whether the user completed the entire task or progressed to some other defined point of the task. As an example, a user who ended a session between subtasks 2 and 3 and did not return within some amount of time to complete the task may be regarded as an unsuccessful interaction accounted-for on the unsuccessful side of line 304.

FIG. 4 depicts an example visualization interface 400 for visualizing user transcripts, in accordance with aspects described herein. The visualization interface can be built by one or more computer system(s) to include digital, graphical elements reflecting aspects discussed herein. The interface may be interactive in that a user can interact with the interface to cause the computer system(s) to update the interface, for instance to reflect additional or other information or elements. The interface might, for instance provides active elements for selection by a user.

Interface 400 includes a task-interaction flow portion 402 presenting a task-interaction flow (e.g. the task-interaction flow of FIG. 1). The task-interaction flow could depict past interactions and/or ongoing interactions by users as the users progress through the tasks. For instance, this interface could be presented to depict user interactions at run-time, e.g. as they progress through subtasks/tasks. In a specific example, a teacher or instructor of students electronically progressing through tasks with a chat agent during a class could visualize user progress through the tasks in real-time because the interface can update the task-interaction flow as additional data is gathered, i.e. as users interact with the chat agent and the interactions are classified as described above.

Toward the right side of interface 400 are interactive interface elements in the form of user-selectable checkboxes for the user of this interface (e.g. an administrator, teacher or other user) to select or deselect as desired in order to identify the information desired in the task-interaction flow of 402. The interface will update depending on what the user selects.

Element group 404 enables the user to select which activities/features, in the form of interaction feature types, are to be reflected in the task-interaction flow. Here, the user has selected for the interface to reflect FITB hint, Hint Type 1, and Hint Type 2 interactions. As depicted in FIG. 4, the interactions reflected include those three hint types in addition to 'misconception' detection interactions and so the computer system(s) building and presenting the interface is/are to update the interface and task-interaction flow thereof to reflect only the selected three hint types. If the user selected the "User Performance" interaction feature type, then an indicator bar for user performance would be added into the task-interaction flow where appropriate.

Other possible interaction feature types in this example include True/False activity, a type of hint activity in which the chat agent solicits from the user a binary response (true/false, yes/no, agree/disagree, etc.), and a concept grouping activity, a type of hint activity in which the chat agents prompts the user to group attributes/concepts into groups.

Element group 406 enables the user to select which emotion types to reflect in the task-interaction flow. Emotion types include in this example fear, anger, joy, and surprise. Selection of any one or more would cause an update to indicators presented along the edges of the polygons. In one example, this might add discrete indicator bars for the selected emotion types. More typically, since emotion is not mutually exclusive of the feature types selectable from group 404, or the other element groups, the selected emotions can be presented as a subset of existing indicators in the interface, for instance a striation or other delineation of each selected emotion within the indicator bar for FITB along each edge.

Element group 408 enables the user to select which interaction types (positive and/or negative) to reflect for the inter-task progression indicators. Here in FIG. 4, the user has selected both and the interface is built/updated and presented to present both along the arrows connecting task elements.

Element group 410 enables the user to select the intervals to represent for purposes of the interval indicators. The user has selected the Turns interval here and so the interval indicators use Turns as the interval reflected by the polygons of the interval indicators. If the user selects more than one interval, then the interface can present an interval indicator of each selected interval for each task reflected in the task-interaction flow.

Figure 5:
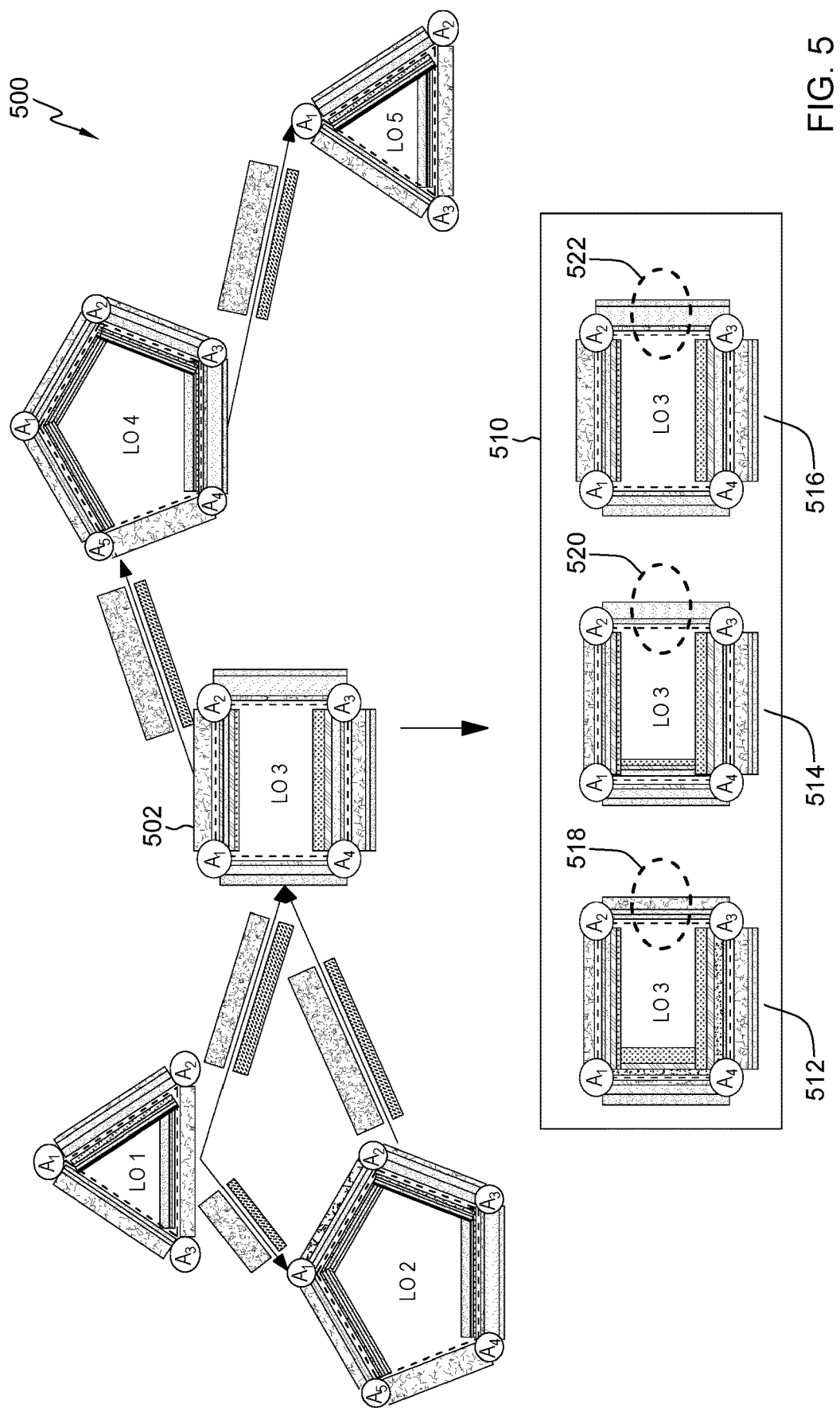
FIG. 5 depicts an example visualization of task interactions of a task based on prior user task traversal, in accordance with aspects described herein.

FIG. 5 depicts an example visualization of task interactions of a task based on prior user task traversal, in accordance with aspects described herein. Task-interaction flow 500 is substantially similar to the task-interaction flow described above relative to FIGS. 1 and 4. A component of that task-interaction flow is task element 502 for task LO3. Task element 502 presents a visualization of all interactions (selected for depiction as discussed above with reference to FIG. 4) of users as they progress through task LO3. In this particular flow, users proceed directly to task LO3 from either of two prior-tasks—LO1 or LO2. Task element 502 presents a composite/aggregate of the user interactions of each set of users, i.e. (i) users who progressed to task LO3 from task LO1 and (ii) users who progressed to task LO3 from task LO2.

Portion 510 of FIG. 5 provides further detail of the LO3 task interactions, specifically details of these two possibilities that are aggregated to form task element 502. In embodiments, portion 510 is presented in the interface based on a user selecting task element 502. Portion 502 provides a visualization of task interactions of task LO3 based on prior user task traversal (i.e. from LO2 or from LO1 directly) and includes three task elements: task element 512 shows a visualization of interactions of users that progressed to LO3 directly from LO1 (rather than from LO2) and task element 514 shows a visualization of interaction of users that progressed to LO3 directly from LO2 rather than directly from LO1. Task element 516 shows a visualization of interaction of users that progressed to LO3 from either LO1 or LO2— effectively an aggregate of the interactions reflected in task elements 512 and 514. This element 516 matches task element 502 because it accounts for all possibilities of prior user task traversal to reach LO3 (in this example users cannot for instance progress to LO3 without progressing from LO1 or LO2).

Taking the interactions in progressing from subtask A2 of task LO3 to subtask A3 of LO3, the user interactions of users coming from LO1 (reflected by 518) are different than user interactions of users coming from LO2 (reflected by 520). Prior user task traversal to reach LO3 therefore appears to have an effect on how the users interact in task LO3. The aggregate of these interactions is reflected by 522.

Figure 6:
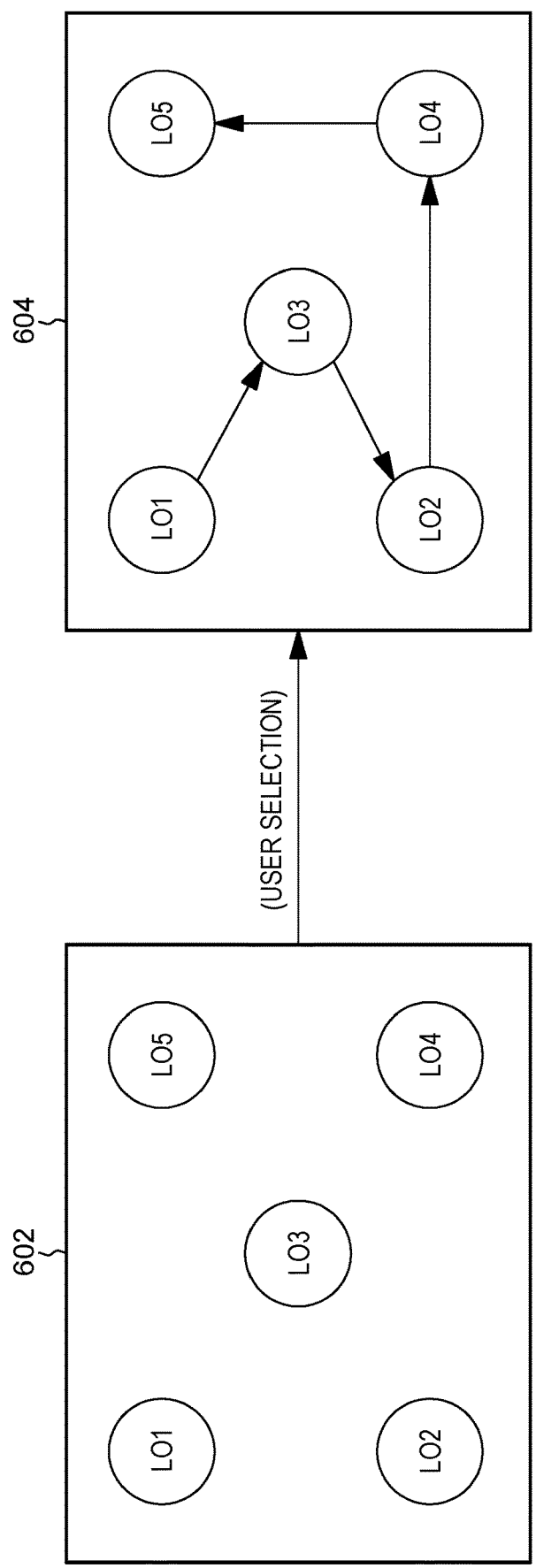
FIG. 6 presents an example of task traversal path selection to define which interactions are to be visualized in a task-interaction flow, in accordance with aspects described herein.

FIG. 6 presents an enhancement in which a user (teacher, admin, etc. —termed an SME) can specify/select a task traversal path to identify which interactions are to be visualized in a task-interaction flow, in accordance with aspects described herein. Element 602 presents a depiction of the tasks, LO1 to LO5, through which users progress. The SME can then select a task traversal path, for instance by interacting with the interface to select tasks in the desired sequence of task traversal to be investigated. Here, the user is interested in seeing a visualization of the user interactions of users who progressed in the sequence LO1→LO3→LO2→LO4→LO5. The selected task traversal path is reflected in interface element 604.

Figure 7:
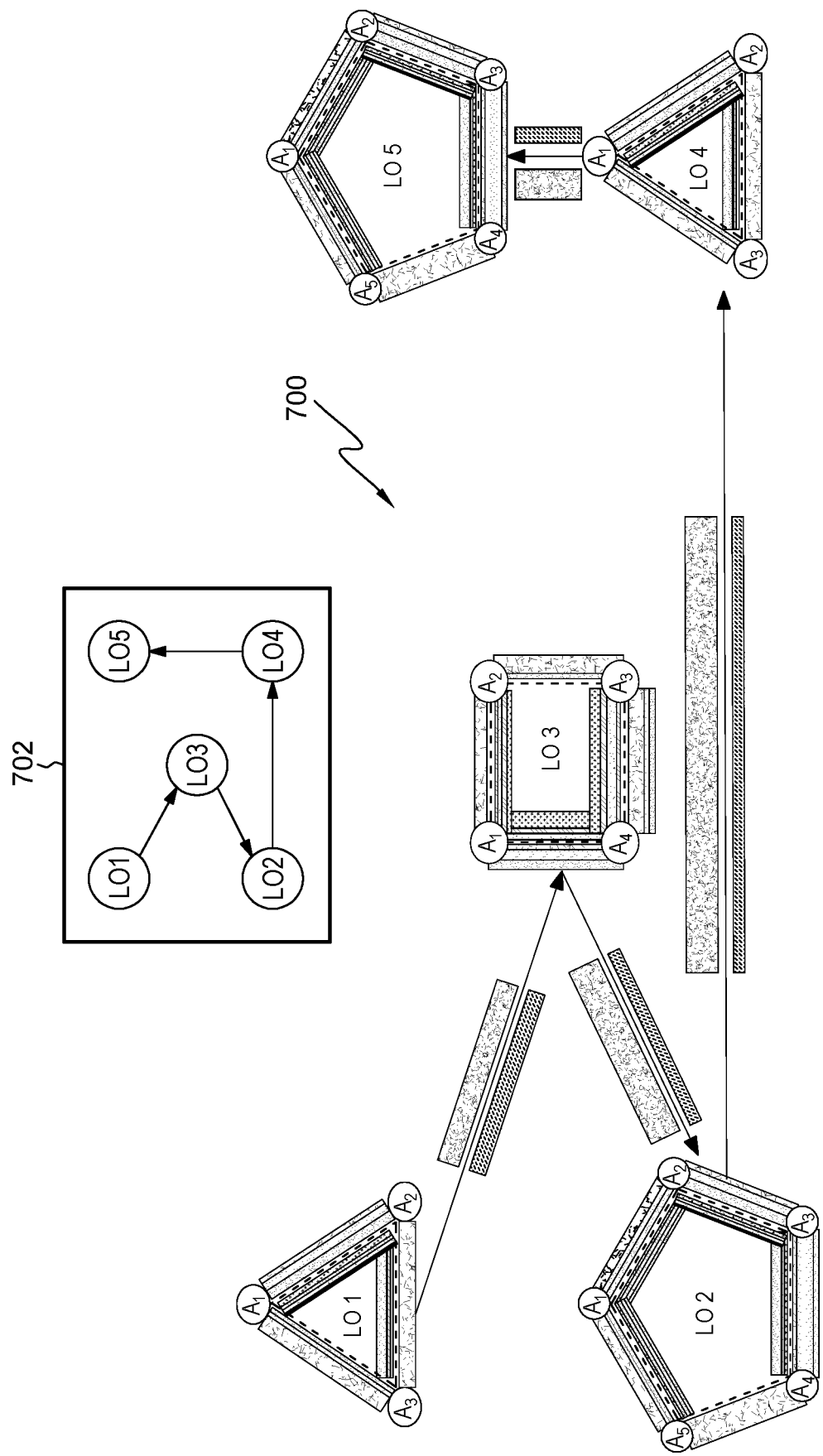
FIG. 7 presents an example task-interaction flow of a selected task traversal path, in accordance with aspects described herein.

On the basis of the user's selection of the task traversal path, a process can build and display an interface presenting the corresponding task-interaction flow. FIG. 7 presents the task-interaction flow of the selected task traversal path, in accordance with aspects described herein. Specifically, task-interaction flow 700 depicts a visualization of the user interactions within and between tasks of users that progressed at least in part along the selected task progression, LO1→LO3→LO2→LO4→LO5. In accordance with this aspect, interactions by users that progressed along a different path, for instance from LO1→LO2→LO3→LO4→LO5, would not be reflected in the task-interaction flow 700. Interface element 702 depicts the selected task traversal path.

It is noted that other features described herein may be utilized with task-interaction flow 700, for instance the feature that enables a user to select a task element (say LO3) and be presented with a visualization of task interactions of task LO3 based on prior user task traversal. Selecting the task element of 700 for task LO3 might present three task elements showing different user interactions, for instance a first task element showing the user interactions of users who progressed along the selected task traversal path (which is the task element for LO3 as already depicted in 700), a second task element that depicts user interactions on LO3 for all users who interacted with LO1 before progressing directly to LO3, and a third task element that depicts the aggregate user interactions of all users who proceeded to/through task LO3). This enables a viewing SME to compare user performance and interactions across sets of users traversing through the tasks using different paths.

Since user interactions may be tracked in real-time, an SME can specify real-time alerts to be raised and actions to be performed relative to users who progress or perform in a specified manner. This could be used to define potential alternate assessments/subtasks to automatically invoke, for instance.

Certain situations might trigger real-time alerts to a teacher using the system for student learning. For instance, if it is automatically observed that a specified activity (subtask) is resulting in >90% negative experiences, the teacher could be alerted to adjust the question, prompt, or task flow. Any such adjustment could be reflected immediately such that other students later progressing to/through the task can have their learning experience adjusted accordingly. The teacher could input alternative assessments/subtasks, alternative to the initial assessment/subtask, for the system to invoke or use in the case of a strong negative reaction to the initial assessment. The teacher could change the question of the subtask, for example. Additionally or alternatively, the system could present the initial assessment but then if a threshold (>90%) of users thereafter have negative experiences then the system can configure the chat agent to use the alternative assessment for the remaining users, as an example. Variations in the wording of questions, question topics, or automatic progression to skip a question/subtask are all possibilities for the SME to customize.

In cases of modified tasks/subtasks, the system could balance results of students who already progressed through the task/subtask so as to not disadvantage those who previously engaged with, skipped, etc. the prior variant of the task/subtask.

As previously noted, user transcripts (completed and/or in progress) are input and a visual transcript representation tool/interface, built and presented by executing software, and including a task-interaction flow, can be presented. The visual transcript representation tool automatically helps identify the information flow when users interact with the chat agent, present a global view of user interactions based on user feature parameters, identify the most successful task traversal path(s), and identify user progress (individual, collective/aggregated). Additionally, it can enable social activities among users that are conceptually proximate each other in the learning/tutoring space as explained elsewhere herein.

A user interaction map or flow can be constructed to depict different interaction flows by different users through a task. In an example in which subtasks A1 to A4 each present a question for the user to answer, a first user, User1, might progress as follows: User1 correctly answers A1, uses a hint on A2, answers A2 incorrectly but is progressed by the system anyway (the chat agent giving the correct answer to User1), uses a hint on A3, answers A3 correctly, uses a hint on A4, provides a partial answer on A4, uses another hint on A4, then correctly answers A4. A second user, User2, might progress as follows: incorrectly answer A1, use a hint on A1, correctly answers A1 and then A2, uses a hint on A3, answers A3 correctly, uses a hint on A4, then answers A4 correctly. Yet a third user, User3, might progress as follows: incorrectly answer A1, use a hint on A1, provide a partial answer for A1 then use a hint on A1, correctly answer A1 then A2, use a hint on A3 and answer A3 correctly, then use a hint on A4 and answer correctly.

Figure 8:
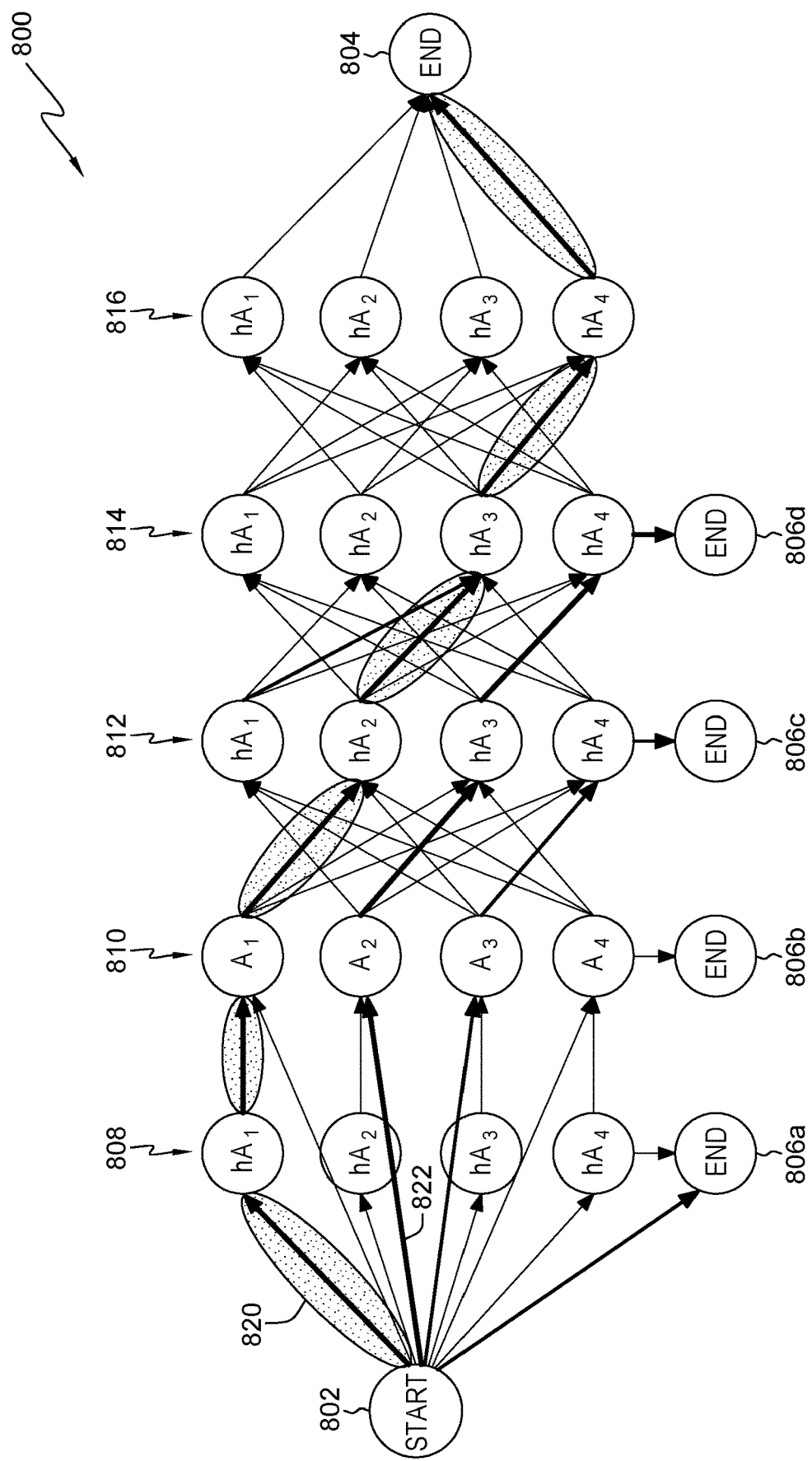
FIG. 8 depicts an example user interaction map depicting possible user interaction flows through subtasks of a task, in accordance with aspects described herein.

FIG. 8 depicts an example user interaction map 800 depicting possible user interaction flows through subtasks of a task, in accordance with aspects described herein. The map includes various nodes. Start node 802 represents a user entering into the task. End nodes 806*a*, 806*b*, 806*c*, 806*d* represent exits before task completion, for instance wrong answers that resulted in the user ending the session. End node 804 represents successful progression through the subtasks to complete the task. Arrows between the nodes indicate user progress from a first node to a target node (to which the arrow points).

Columns 808, 812, 814, and 816 of nodes represent respective hints provided for subtasks A1 through A4. Column 810 of nodes represents the four subtasks of the task. It is seen that in some instances a user entering the task flow proceeds directly to a later subtask (e.g. A2, A3 or A3). This may be done based on prior knowledge about performance of the particular user or after asking the user a broader question that establishes which subtask the user should be initially directed to, as examples.

The user interaction map 800 does not present all possibilities of user interaction and progression through the subtasks, though in examples the map could be more robust and exhaust all such possibilities.

Noted is a highlighted progression path 820. This is used to indicate the path that was most frequently taken by users progressing through the task and reflects that a hint was provided for A1, followed by successful completion of A1 and then hints were provided for each of A2, A3 and A3 before the user completed the task. This most successful path can be data mined by analyzing the user interactions (e.g. from the task-interaction flow of FIG. 1). Additionally, the path 822 indicated using bold arrows can indicate the path that most frequently resulted in an abrupt stop (at node 806d).

Figure 9:
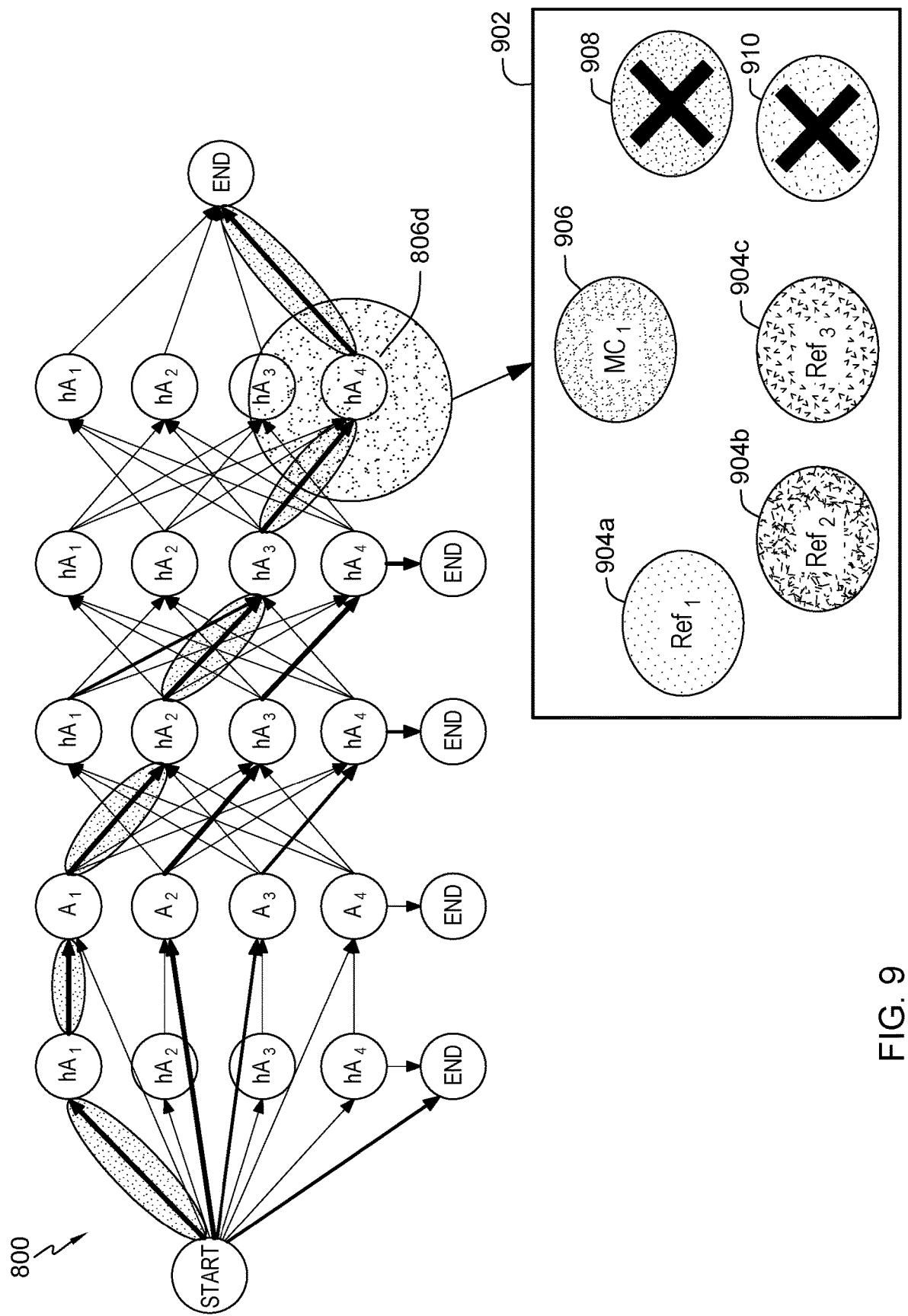
FIG. 9 depicts an example interface reflecting sets of users and respective interactions at a selected point in task traversal, in accordance with aspects described herein.

FIG. 9 depicts an example interface reflecting sets of users and respective interactions at a selected point in task traversal, in accordance with aspects described herein. Here, the SME has selected node 806d of user interaction map 800 (FIG. 8). Node 806d represents that a hint (optionally of a selected/specified type) was provided as part of subtask A4. In response to the SME's selection of element 806d, the interface presents an interface portion 902 graphically depicting different sets of users and corresponding interactions in connection with the provided hint. The user interactions reflected could be those that were provided by the user in response to the provided hint represented by 806d.

The sets 904a, 904b, 904c each represent a respective set of users who expressed a respective variant of the correct ('reference') answer. In this regard, a reference answer may be an initial or original answer defined for the subtask A4. Practically speaking, there may be several ways to correctly answer the same question. User-provided answers might not match exactly what the system maintains as the reference answer, as users might use slightly different words, punctuation, and so on. Nevertheless, there may be several different expressions/variants of the reference answer that are correct. Here, there are three such variants that were expressed by the users traversing to node 806d.

Set 906 represents the set of users who expressed a similar misconception after the hint, and sets 908 and 910 each represent a respective set of users who expressed a respective similar incorrect answer in response to the hint. Here, each user who expressed an incorrect answer is clustered into one of two clusters/groups 908, 910.

Elements representing the sets are presented as circles in this example but these elements could be any shape or other graphical element. In examples, the size of the graphical element representing a set may be directly proportional to the number of users whose interactions fell into that set. This can indicate to the SME an easy way to identify the numbers of users in each set relative to the others sets.

Figure 10:
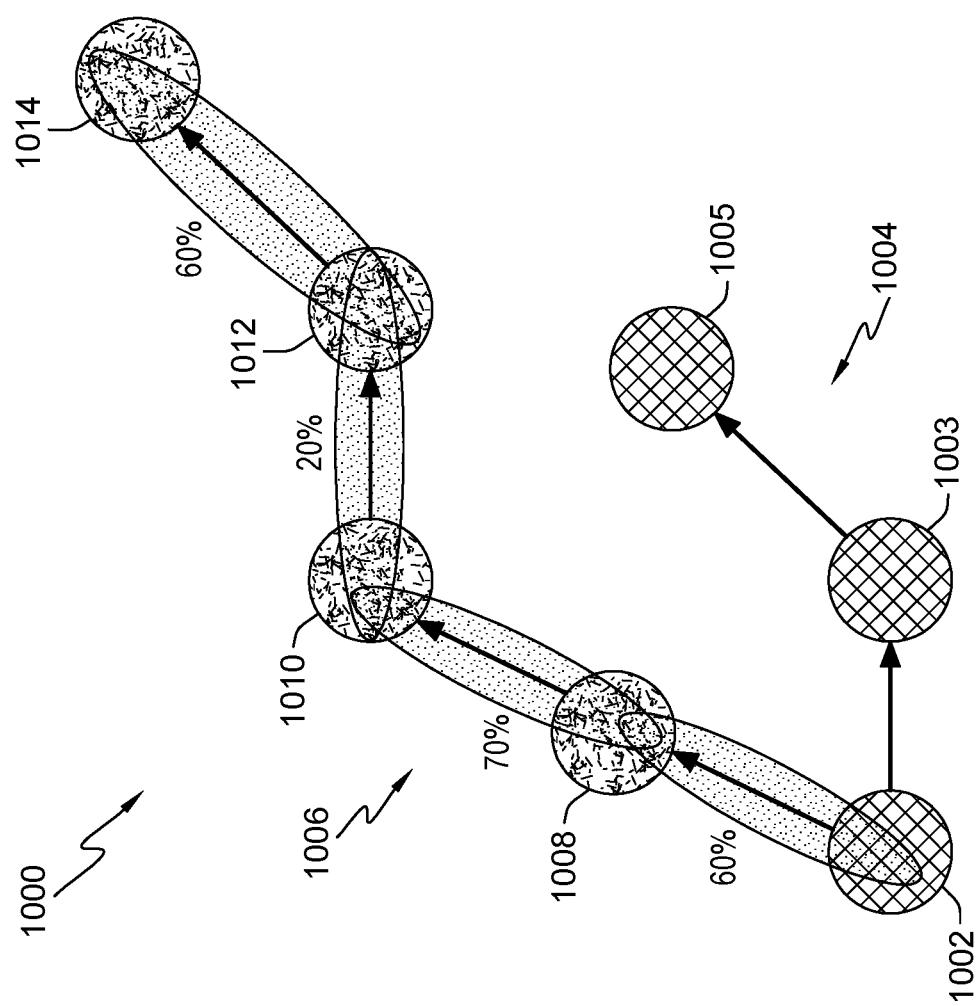
FIG. 10 depicts an example interface showing a user's interaction flow relative to another interaction flow of other users, in accordance with aspects described herein.

FIG. 10 depicts an example interface 1000 showing a user's interaction flow relative to another interaction flow of other users, in accordance with aspects described herein. The nodes represent user interactions beginning from an initial point 1002 to progress through one or more subtasks (and possibly through one or more tasks). Interaction flow 1004 presents the current progress of the interaction flow of a specified or selected individual user (User1), and reflects that User1 has two interactions since beginning from starting point 1002. For instance, a subtask presents a user with a question (reflected by 1002), the first user provides an interaction that causes the chat agent to provide a hint in response (progressing the user to point 1003), after which the user expresses confusion (progressing the user to point 1005) at which the chat agent provides some guidance or the answer and then asks the question again. This may all be within a single activity/subtask, for instance.

Interaction path 1006 presents progress of various users from starting point 1002 to current point 1014 via points 1008, 1010, and 1012. The percentages presented at the edges between a first node and a second node along path 1006 reflect the percentage of users that progressed, based on their interaction, to the second node from the first node. It shows for instance that 20% of users at point 1010 then progressed to point 1012 on the basis of their interaction(s). The other 80% of users at point 101 progressed to one or more other point(s) (not shown).

Interface 1000 may be updated as the individual User1 and/or other users reflected in path 1006 progress. In this regard, the interface can track and reflect current progress and performance of User1 relative to other users and this may be done in real-time as user interactions occur.

Figure 11:
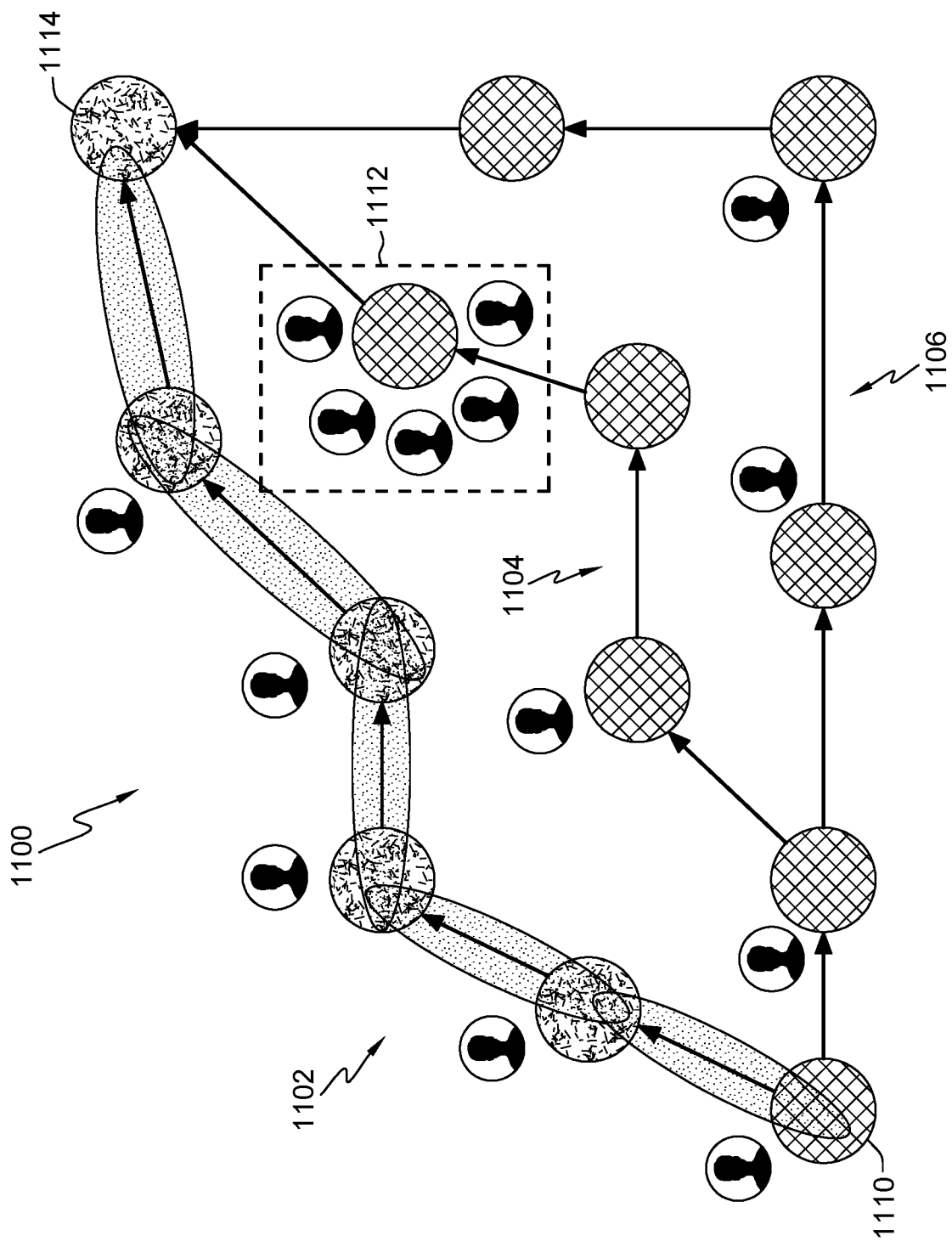
FIG. 11 depicts another example interface showing user interaction flows relative to each other, in accordance with aspects described herein.

FIG. 11 depicts another example interface 1100 showing user interaction flows relative to each other, in accordance with aspects described herein. Interface 1100 is similar to that of FIG. 1000 in that it shows different paths (1102, 1104, 1106) of user interactions different users in progressing from a point (1110) to another point (1114). Path 1102 presents the path taken by a group of users (for instance the most frequently taken path of all users progressing from 1110 to 1114), while paths 1104 and 1106 presents the respective paths of two different groups of user(s) in progressing from 1110 to 1114.

Interface 1100 enables an SME to visualize where the users are in the workflow and how they are progressing. The SME can select a node, such as node 1112, and be presented with details of the run-time user state of that node, for instance details of users currently at, or who passed through, that node. This can enable social learning activities, task/subtask refinement, and optional out-of-band activities, as examples. The interface identifies these users for the SME and enables the SME to define or provide activities to present to those users in order to emphasize concepts, objectives, tasks, and the like. The SME could invoke concept grouping, true-false exercises, or live tutoring, for instance, in order to improve user engagement and performance. The SME can update learning objective content, such as by adding answer variants, additional hints, etc. to improve user experience. In some embodiments, these and other activities can be automatically identified, for instance based on machine learning to identify which are most effective at achieving a defined goal to progress these users, and invoked or presented to the users. All of this may be in-band or out-of-band of the progression through defined subtasks/tasks that are reflected in the task interaction flows previously described.

Ultimately, a visualization of how users progress through tasks/subtasks via their interactions with the chat agent can be used to make learning systems more accurate and effective at teaching/conveying difficult content, identifying where user misconceptions lie and how to improve instruction.

Aspects can visually depict how users progress through subtasks/tasks, and it is also possible to present a leaderboard of users. The leaderboard can feature all or just some users of a collection of users. It could be limited to a network of friends in an online social network for instance so that the users can see their performance relative to their friends in the network.

Each task could have an associated leaderboard and there could be provided an overall/aggregate across tasks. A leaderboard can show a rank of users based on points or other measure. The points can be assigned based on how users progress through tasks/subtasks (whether they needed hints to answer questions, which paths they took in progressing, etc.). Any desired point system can be defined in which user performance, as reflected by their interactions with the chat agents, can be scored.

Users can be grouped based on their scores for a given task or collection of tasks. The system could suggest these groupings to group users with similar scores, as one example, or to group users in a way that normalizes/averages overall group scores, as another example. In the latter situation, the system can automatically determine groups of users such that, when each group's user scores are averages, the average scores of the groups are within some threshold or deviation of each other in order to partition the collection of users in to groups of roughly equal performance (at least as reflected by user scores). This may be useful to impart fairness in game and learning activities that require groups of users to compete against each other.

Figure 12:
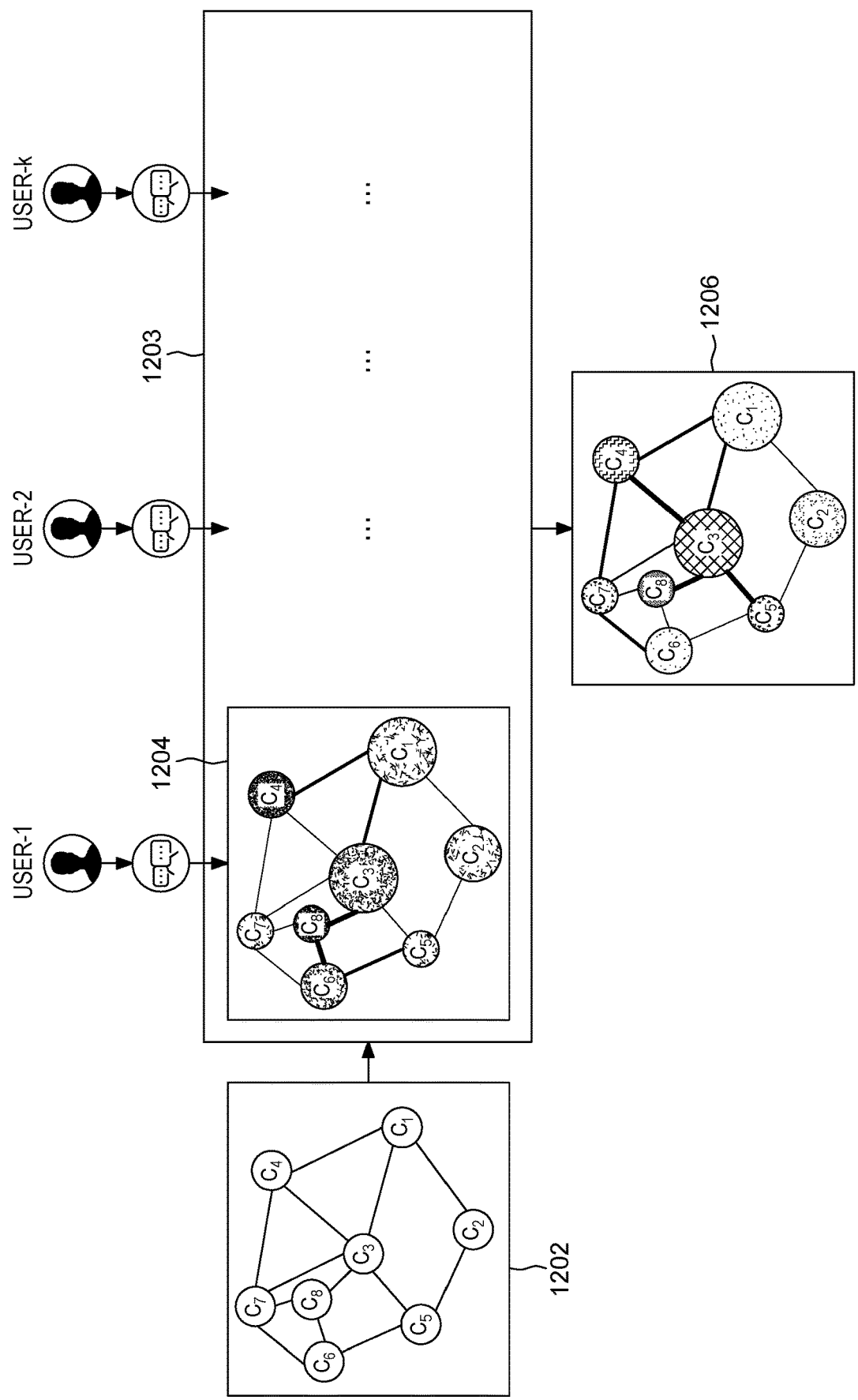
FIG. 12 presents an example visualization of concept expression in user interactions, in accordance with aspects described herein.

FIG. 12 presents an example visualization of concept expression in user interactions, in accordance with aspects described herein. The tasks/subtasks through which users progress can emphasize various concepts of which the users are to express an understanding. Each concept may or may not correlate directly to a specific subtask or task. A task might teach a concept using four subtasks, each subtask might correspond to an individual concept feature of a concept taught by the task, or each subtask might teach an individual and distinct concept that is part of a larger learning objective of related but different concepts, for instance.

In any case, the concepts can be mapped to each other and presented in a concept map that is generated either manually by SME(s) or automatically in some examples. FIG. 12 depicts a concept map 1202 of seven concepts labeled $c_1$ through $c_7$. The nodes representing the concepts are linked by edges that represent a relation between the concepts. The concepts could be related by any desired relation. One example relation is of dependency in which understanding of one concept is regarded as a dependency in understanding another concept.

Concepts $c_1$ and $c_2$ are directly related because there is an edge between them. Concept $c_1$ is not directly related to concept $c_6$ because there is no edge directly connecting them, but they are indirectly related because there are intervening concepts along multiple different paths between the two concepts $c_1$ and $c_6$.

User interactions can be automatically analyzed/classified (for instance using trained machine learning model(s)) to determine to what degree or level each user has expressed each concept in a concept map, such as map 1202. Each user's concept expression can then be reflected in a visualization specific to that user. FIG. 12 presents a visualization 1204 of user-specific concept expression for user-1. The visualization 1204 can be presented in an interface 1203 for an SME and includes a node correlating to each concept of the concept map 1202. The concept nodes of visualization 1204 are positioned analogous to their counterpart concept nodes in the concept map 1202. Here, however, the size of a concept node is proportional to the extent to which the user expressed that concept in the analyzed user interactions. Expression of a concept can be a measure of the user's proper understanding of the concept. User-1 expressed concept $c_3$ most extensively as reflected by 1204 because the node for $c_3$ is largest of each of the nodes presented. Concept $c_5$ was expressed least extensively by user-1 because the corresponding node is smallest of those in the user's concept map. A visualization specific to other users (user-2, . . . , user-k, not shown) can also be presented in the interface 1203.

The individual user-specific concept expressions for a collection of users can be aggregated and presented in an aggregate visualization of user-specific concept expression across a collection of users, termed herein an experience map. Visualization 1206, which can also be built and presented in an interface for an SME, can present the aggregate (across the collection of users) extent of expression of each concept as an experience map. In this example, the collection of users in the aggregate expressed concept $c_3$ most extensively as reflected by 1206 because the node for $c_3$ is largest of each of the nodes presented.

FIG. 12 uses node size to convey the extent of concept expression but in other examples shading, coloring, patterning, or other highlighting of the nodes is used to convey the extent of concept expression.

In addition, concept expression could be assessed for both concept understanding and concept misunderstanding. A user might express a concept frequently but use it in a way that demonstrates a misunderstanding of the concept or its application. Colors, patterns, line thicknesses, or any other highlight can be used to indicate the level of the user's understanding of each concept. This can be useful in ascertaining where further emphasis might be placed in task/subtasks to facilitate a better user understanding of the concept.

User-specific concept expression can be useful in reflecting concepts that might not be understood well and/or not expressed by users, which and how many concepts are expressed, and the relationships between them. In this latter regard, user interactions could also reflect user understandings as to the relation between concepts (reflected by edges/lines between concept nodes in the visualizations of FIG. 12). Thickness of a line between two concept nodes could be used to reflect the degree to which the user expressed an understanding of the relation between those concepts.

Figure 13:
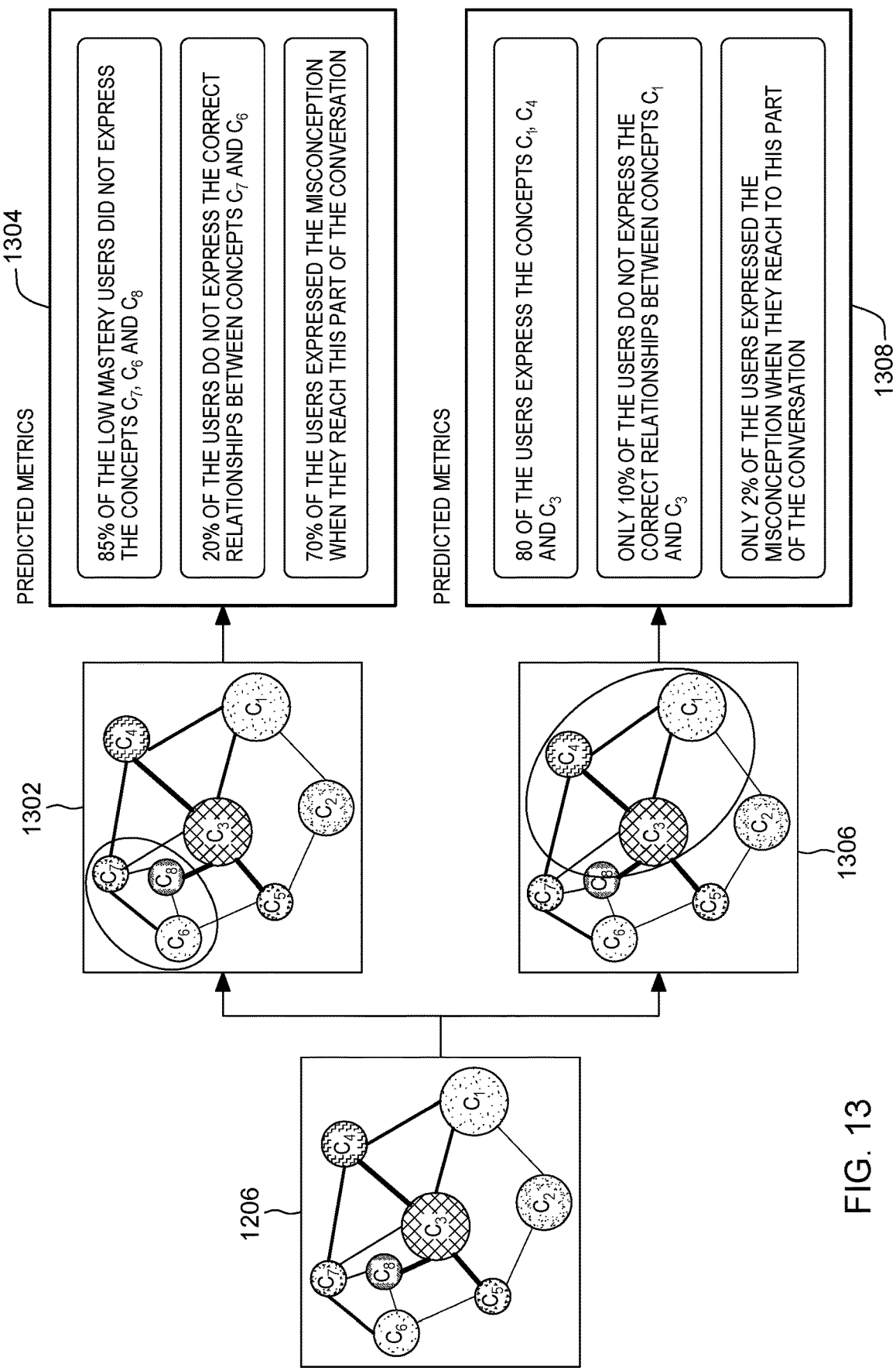
FIG. 13 depicts an example of sub-graph analytics on a user experience map, in accordance with aspects described herein.

The experience map can be interactive and provide easy visualization of sub-graph analytics for an SME-selected sub-graph of the experience map. FIG. 13 depicts an example of sub-graph analytics on a user experience map, in accordance with aspects described herein.

In FIG. 13, experience map (1206 of FIG. 12) is presented to an SME and the SME can select/specify via the interface a sub-graph (node(s) and intervening edges if applicable) of the experience map. This prompts the system to present analytics determined for the elements encompassed by that selected sub-graph. Example 1302 depicts that the SME has selected concepts $c_6$, $c_8$ and $c_8$. The system responds, determines (if not already determined), and presents (in 1304) metrics relative to that sub-graph. Here, 85% of a group of users labeled as having low mastery of the concepts did not express the three concepts, 20% of users did not express correct relationships between concepts $c_6$ and $c_7$, and 70% of users expressed concept misconception when reaching a particular point in task interaction with the chat agent.

Similarly, example 1306 depicts that the SME has selected concepts $c_1$, $c_3$ and $c_4$. The system responds, determines (if not already determined), and presents (in 1308) metrics relative to that sub-graph. Here, 80 users expressed these concepts, 10% of users did not express correct relationships between concepts $c_1$ and $c_3$, and 2% of users expressed concept misconception when reaching a particular point in task interaction with the chat agent.

It is noted that an experience map is not limited to conveying concept expression. Experience maps for other features, alone or in combination with each other, could be built and presented. For instance, an experience map of emotion types, interaction types and features (positive, negative, FITB hints, Hint Type 1, misconceptions, etc.), or any other features or properties of user interactions could be built in which nodes represent feature types and edges represent some relations between them. They could similarly enable an SME to invoke sub-graph analytics/querying for insights.

Any interfaces, visualizations, functionality, or other aspects described herein can be provided to SMEs, as described, and/or any other users, including those user(s) whose transcripts and interactions are analyzed. It may be useful to present certain visualizations to the user in order to show the user's progress, performance, etc., and in some examples relative to progress/performance of other users. Interface 1000, as just one example, may be presented to a user showing the user's interaction flow (1004) relative to the interaction flow (1006) of peers.

Accordingly, aspects described herein provide various applications and related insights, some examples of which are provided as follows:

Individual user/user-level insights: Visualize and identify individual user interactions at particular task (e.g. learning objective) and subtask (e.g. activity) levels; visualize and learn user interactions with a chat agent; visualize personalized task progression (e.g. learning path such as LO1→LO4→LO3→LO5) and identify hotspots, ascertaining deterrent and difficulty levels for subtasks and/or tasks from the learning paths Peer-level insights: Identify positive and negative interactions at task and/or subtask levels; visualize and determine successful and difficult learning paths based on aggregated users interactions with the chat agent; learn suggested learning paths, suggest or drive users to specific learning paths such as LO2→LO3→LO1→LO4→LO5 to result in the most effective learning; identify and visualize peer features from user transcripts; identify aggregated emotions of peers at the interaction feature and task/subtask levels; identify session-level transcript visualization features for peer level insights; enabling selection of a specific learning path to visualize users interactions at feature/task/subtask levels Information flow: Identify different types of information flow at a subtask level to aide an SME in refining the learning content (for example identifying answer alternates/variants by analyzing user-provided answers)

Sub-graph analytics and experience map: Identify features common within a peer group or across users by querying a subset of nodes in an experience map, with nodes representing concepts, emotion types, or any other features Enable social learning activities: Identify a run-time state of the chat agent and user progression; identify users are at the same state in progression through tasks(s)/subtasks(s) and enable task/subtask changes, additions, removal, etc. and/or social/collaborative activities by an SME or a trained artificial intelligence (AI) model, to enhance user engagement with, and understanding of, learning objectives Run-time user progress view: Show SMEs and/or other users, such as those whose interactions are analyzed, a progress view relating the user's interactions to those of other users Systems, approaches, and processes to analyze, reflect, and enhance user chat agent interactions and generate insights are provided. Aspects provide visualization of user transcripts based on user-defined parameters, automatically learn transcript visualization features from user transcripts, provide insights at the individual user-level and peer level about user interactions at task/subtask levels, provide a visualization of user progress as compared to peers, provide a framework for visualizing run-time user interactions to aid SMEs in ascertaining user understandings and experience, estimate user experience/understanding through selection of user-defined interaction flows, and enable social activities when users are proximate in the learning space, as examples.

Figure 14:
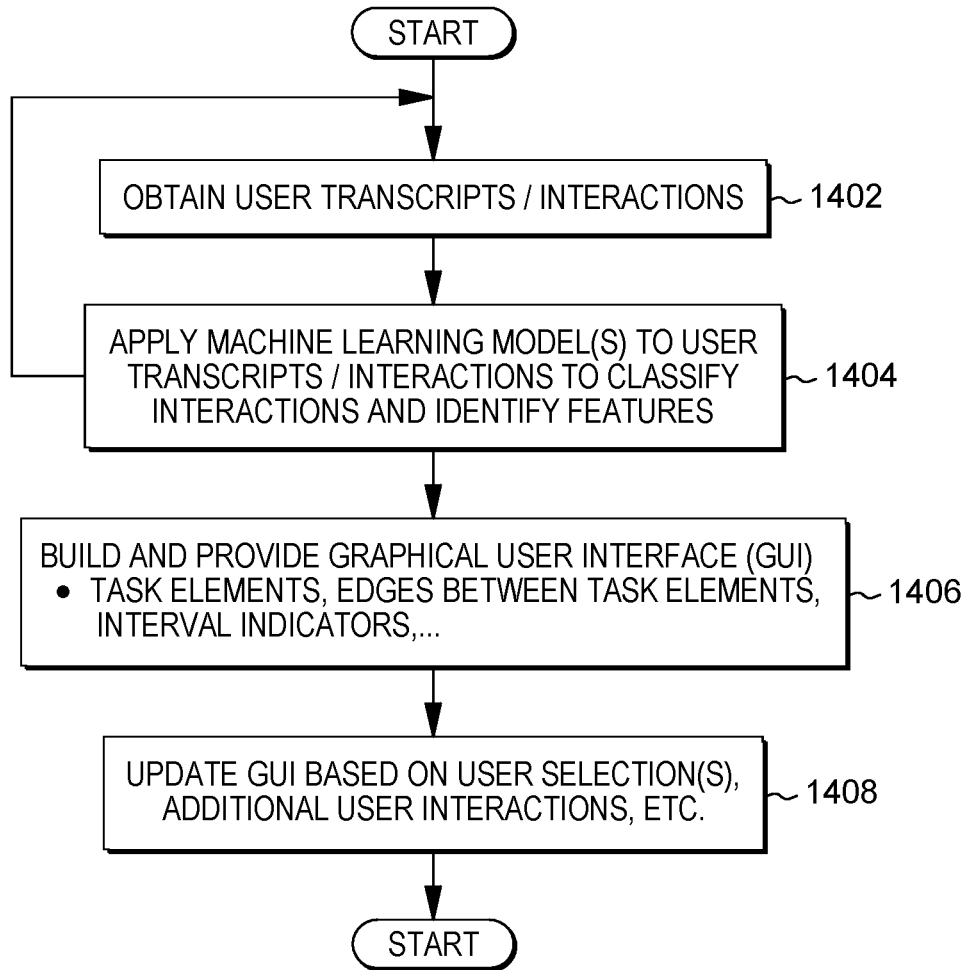
FIG. 14 depicts an example process for visualization of classified user interactions with an interactive computing platform, in accordance with aspects described herein.

FIG. 14 depicts an example process for visualization of classified user interactions with an interactive computing platform, in accordance with aspects described herein. In some examples, the process is performed by one or more computer systems, such as those described herein, which may be or include computer system(s) providing an interactive computing platform with which users interact to provide the user interactions or other computer system(s) in communication therewith, one or more cloud computer systems, and/or one or more other computer systems, as examples.

The process begins by obtaining (1402) user interactions between users and the interactive computer platform, which user interactions could be provided as part of user transcripts of interactions between the users and the interactive computing platform, as examples. The user interactions may be those between the users and the interactive computing platform in progression of the users through tasks based on the user interactions, with the tasks being provided/presented by the interactive computer platform. The process then applies (1404) at least one machine learning (ML) model to user transcripts/interactions. The at least one ML model is trained to classify the interactions with the interactive computing platform. Different ML models may be trained to classify the interactions into different types of features, for instance emotions expressed, the content of the interactions (types of interactions, for instance hint types, content expression, conception/misconception of concepts, sentiment, positive/negative interactions). Other feature types are possible. In any case, the applying classifies the user interactions and identifies features of the user interactions.

In embodiments, the interactive computing platform is or includes an interactive learning platform. The interactive learning platform can be one provided to students or other users who interact with the interactive learning platform. The interaction can be though a chat agent provided by the platform. The users can interact with the chat agent to provide the user interactions included in the user transcripts. In these embodiments, example tasks are learning objectives through which the users are to progress.

The process continues by building and providing (1406) a graphical user interface (GUI) of graphical elements for display on a display device. The computer system(s) performing the building and providing could also display the GUI (for instance on a display device attached thereto or in communication therewith), or could provide the GUI to other computer system(s) for display on a display device.

The graphical elements of the GUI present visualizations of the user interactions and the identified features thereof relative to the tasks and progression of the users therethrough. The GUI can include, for each of the tasks, a respective task element that reflects identified features of the user interactions of user(s) in those user(s) progressing through that particular task. In this manner, the task element for a task can reflect only the user interactions relative to progression through that task, and no other tasks. The user interactions of the user(s) relative to a single task refers to a set of user interactions of one or more users in progressing through that task. It is noted that not all of the one or more users may have progressed all of the way through the task; some or all of such user(s) may have progressed only partially through the task.

The building and providing the GUI can include building a task element for one of more of the tasks each as a respective polygon having vertices corresponding to subtasks of the task and edges between the vertices. Application of the at least one ML model can identify one or more features of user interaction(s), of the set of user interactions, of at least one user in progressing that at least one user from one subtask of the task to a sequentially-next subtask of the task, and thus building the task element can include building an edge between a first vertex corresponding to the one subtask and a second vertex corresponding to the sequentially-next subtask of the task. The edge can include at least one graphical element (an indicator bar for instance) corresponding to each feature of the one or more features of the user interactions of that at least one user. Each graphical element can be provided with a different highlight, pattern, color, or any other visual indication that distinguishes it from the graphical elements corresponding to the other features represented.

The identified feature(s) of user interactions in progressing from one subtask to another can include classified interaction types of the user interactions of the at least one user, and building the edge can further include providing, as part of the edge, a respective at least one graphical element corresponding to each classified interaction type of the classified interaction types. It is noted that there could be more than one graphical element provided to correspond to a single interaction type or other feature, for instance in cases where the features presented for an edge are classified as positive or negative interactions and each such class (positive/negative) can include user interactions that are classified the same along some other classification (hint type for instance).

Accordingly, in some embodiments, the identified features further include identified positive user interactions and negative user interactions of the user interactions of the at least one user (i.e. in progressing from the one subtask to the other subtask), in which case building the edge can further include providing a first one or more graphical elements representing the positive user interactions on a first side of an edge line between the first vertex and the second vertex, and providing a second one or more graphical elements representing the negative user interactions on a second side of the edge line between the first vertex and the second vertex (e.g. as shown in FIG. 2).

The building and providing the GUI can include, in some embodiments, building and providing with a task element an interval indicator (e.g. as in FIG. 3) specific to the task. The interval indicator can present a visualization of interval information of the at least one user in progressing through the task. The interval information can include discrete intervals of one or more measured properties of the progression by the at least one user through the task. The one or more measured properties could be turns, sessions, and/or time taken by the at least one user in progressing through the task, as examples. In some examples the properties are determined from the interactions in conjunction with interaction classification by the ML model(s) and/or by monitoring user engagement with the interactive platform.

The building and providing the GUI can include building, between a first task element corresponding to a first task of the tasks and a second task element corresponding to a second task of the tasks, an edge and one or more graphical elements representing user experience (e.g. bars representing positive and negative experience) with the second task after progressing from the first task.

Aspects of FIG. 14 can be performed continuously or iteratively to provide real-time/run-time updating of the interface based on received additional interactions. This can be useful in situations where a teacher is monitoring in real-time the performance of students in progressing through the task. In these aspects, the process obtains additional interactions (e.g. as at 1402) and applies (e.g. as at 1404) the at least one ML model to additional user interactions, in real-time as the additional user interactions are provided, to classify the additional user interactions and identify features of the additional user interactions. The process builds and provides updates to the GUI in real-time as those additional user interactions are provided and the at least one ML model is applied to classify the additional user interactions and identify the features of the additional user interactions.

Updating (1408) the GUI updates the visualizations to reflect the additional user interactions and identified features thereof relative to the tasks and progression of the users therethrough. In addition, based on a GUI user interacting with an interactive graphical element of the GUI, for instance to select one or more feature types of the identified features and/or a task element corresponding to a task of the tasks, the process at 1408 updates the GUI to change the graphical elements presenting visualizations of the user interactions and the identified features thereof. If the GUI user selects feature type(s) (e.g. as in FIG. 4) the user can define which features to reflect in the GUI. If the GUI user selects a task element, the GUI can update to provide a visualization of task interactions of the selected task based on prior user task traversal, e.g. as in FIG. 5.

Additionally or alternatively, a GUI user could select a specific task traversal path for details of users who progressed along that path. There can be a plurality of different possible task traversal paths that exist through which the users can progress through the tasks. A process can receive a selection, by a GUI user, of a selected task traversal path of the plurality of possible task traversal paths. The GUI the graphical elements (remove/add/update element(s)) to present visualizations that reflect user interactions, and the identified features thereof, that include the user interactions of a first set of users who progressed through the tasks along the selected task traversal path and exclude the user interactions of the other users—a second set—who progressed through the tasks along any other task traversal path different than the selected task traversal path. The respective task element for each of the tasks reflects identified features of user interactions that include the user interactions of the first set of users in progressing through that task and excludes the user interactions of the second set of users in progressing through that task. In this manner, the GUI built and presented to the user will not reflect the interactions of the users who progressed down a different path than then one selected by the GUI user.

the one or more machine learning models can be built and trained to recognize features of user interactions. Thus, some embodiments can include building and training the ML model(s) using labeled user transcripts with labels of the features of user interactions included in the labeled user transcripts.

Although various examples are provided, variations are possible without departing from a spirit of the claimed aspects.

Figure 15:
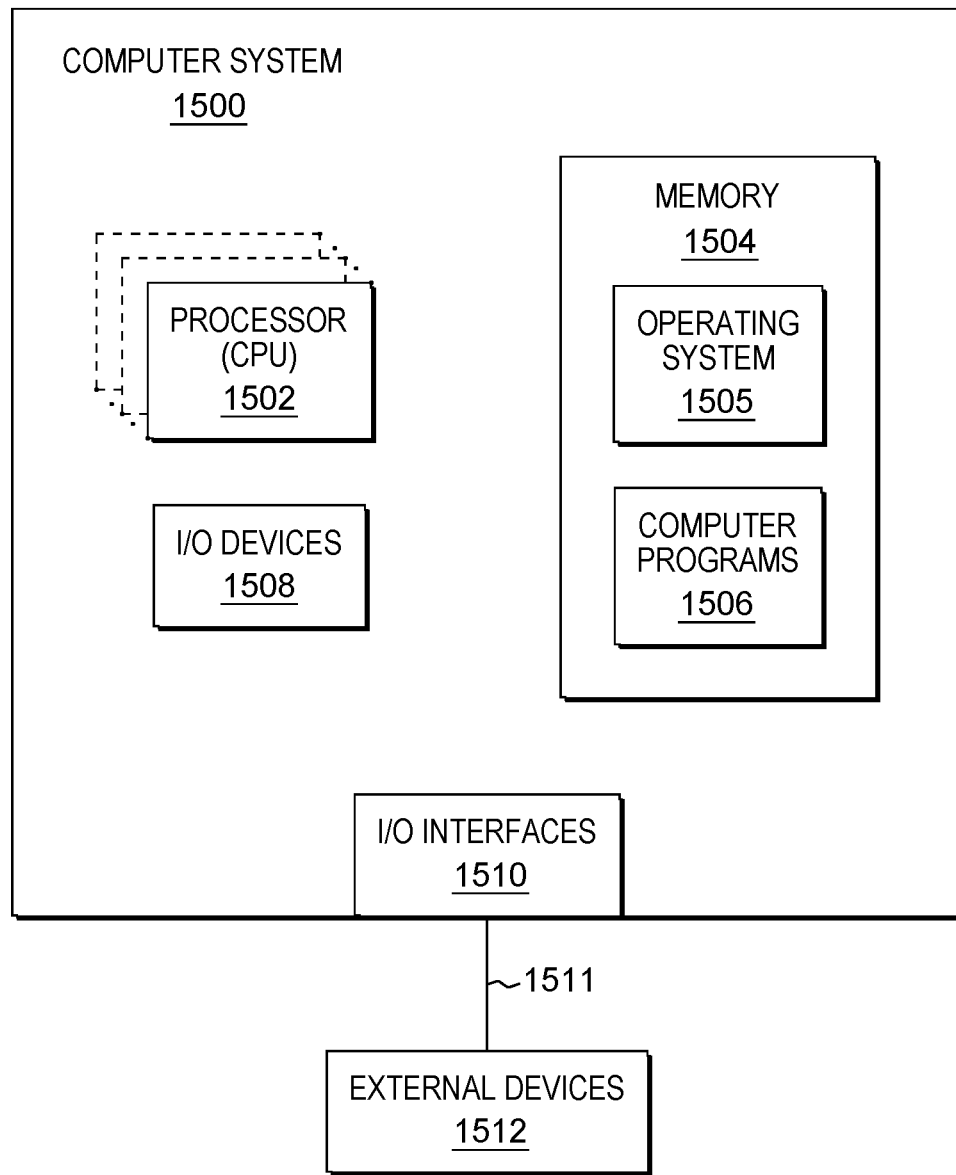
FIG. 15 depicts one example of a computer system and associated devices to incorporate and/or use aspects described herein.

Processes described herein may be performed singly or collectively by one or more computer systems. FIG. 15 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 15 shows a computer system 1500 in communication with external device(s) 1512. Computer system 1500 includes one or more processor(s) 1502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1502 can also include register(s) to be used by one or more of the functional components. Computer system 1500 also includes memory 1504, input/output (I/O) devices 1508, and I/O interfaces 1510, which may be coupled to processor(s) 1502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1504 can be or include main or system memory (e.g. Random Access Memory) used in the execution of program instructions, storage device(s) such as hard drive(s), flash media, or optical media as examples, and/or cache memory, as examples. Memory 1504 can include, for instance, a cache, such as a shared cache, which may be coupled to local caches (examples include L1 cache, L2 cache, etc.) of processor(s) 1502. Additionally, memory 1504 may be or include at least one computer program product having a set (e.g., at least one) of program modules, instructions, code or the like that is/are configured to carry out functions of embodiments described herein when executed by one or more processors.

Memory 1504 can store an operating system 1505 and other computer programs 1506, such as one or more computer programs/applications that execute to perform aspects described herein. Specifically, programs/applications can include computer readable program instructions that may be configured to carry out functions of embodiments of aspects described herein.

Examples of I/O devices 1508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1512) coupled to the computer system through one or more I/O interfaces 1510.

Computer system 1500 may communicate with one or more external devices 1512 via one or more I/O interfaces 1510. Example external devices include a keyboard, a pointing device, a display, and/or any other devices that enable a user to interact with computer system 1500. Other example external devices include any device that enables computer system 1500 to communicate with one or more other computing systems or peripheral devices such as a printer. A network interface/adapter is an example I/O interface that enables computer system 1500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 1510 and external devices 1512 can occur across wired and/or wireless communications link(s) 1511, such as Ethernet-based wired or wireless connections. Example wireless connections include cellular, Wi-Fi, Bluetooth®, proximity-based, near-field, or other types of wireless connections. More generally, communications link(s) 1511 may be any appropriate wireless and/or wired communication link(s) for communicating data.

Particular external device(s) 1512 may include one or more data storage devices, which may store one or more programs, one or more computer readable program instructions, and/or data, etc. Computer system 1500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1500 may be operational with numerous other general purpose or special purpose computing system environments or configurations. Computer system 1500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 16:
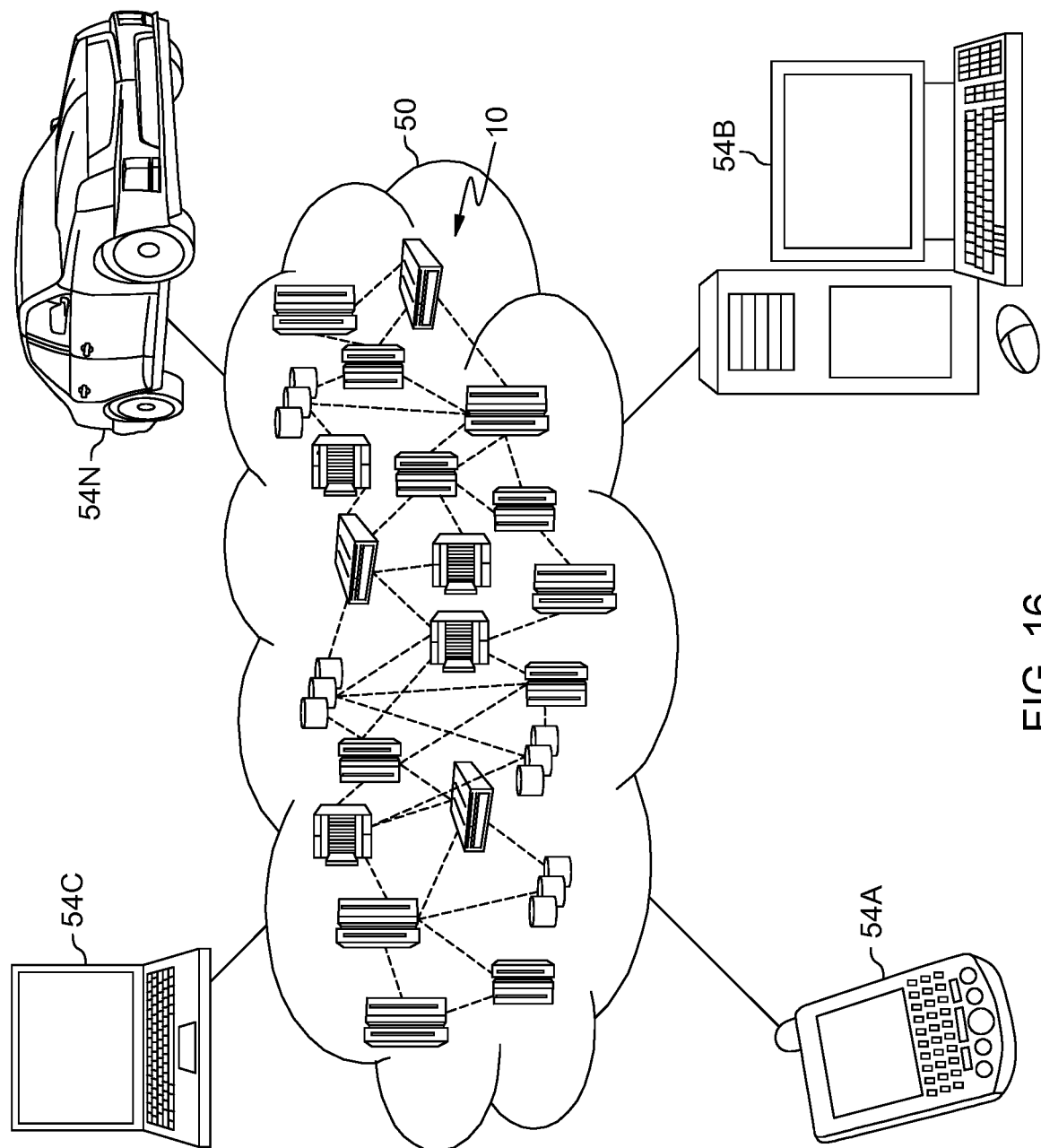
FIG. 16 depicts a cloud computing environment according to an embodiment of the present invention.

Referring now to FIG. 16, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Figure 17:
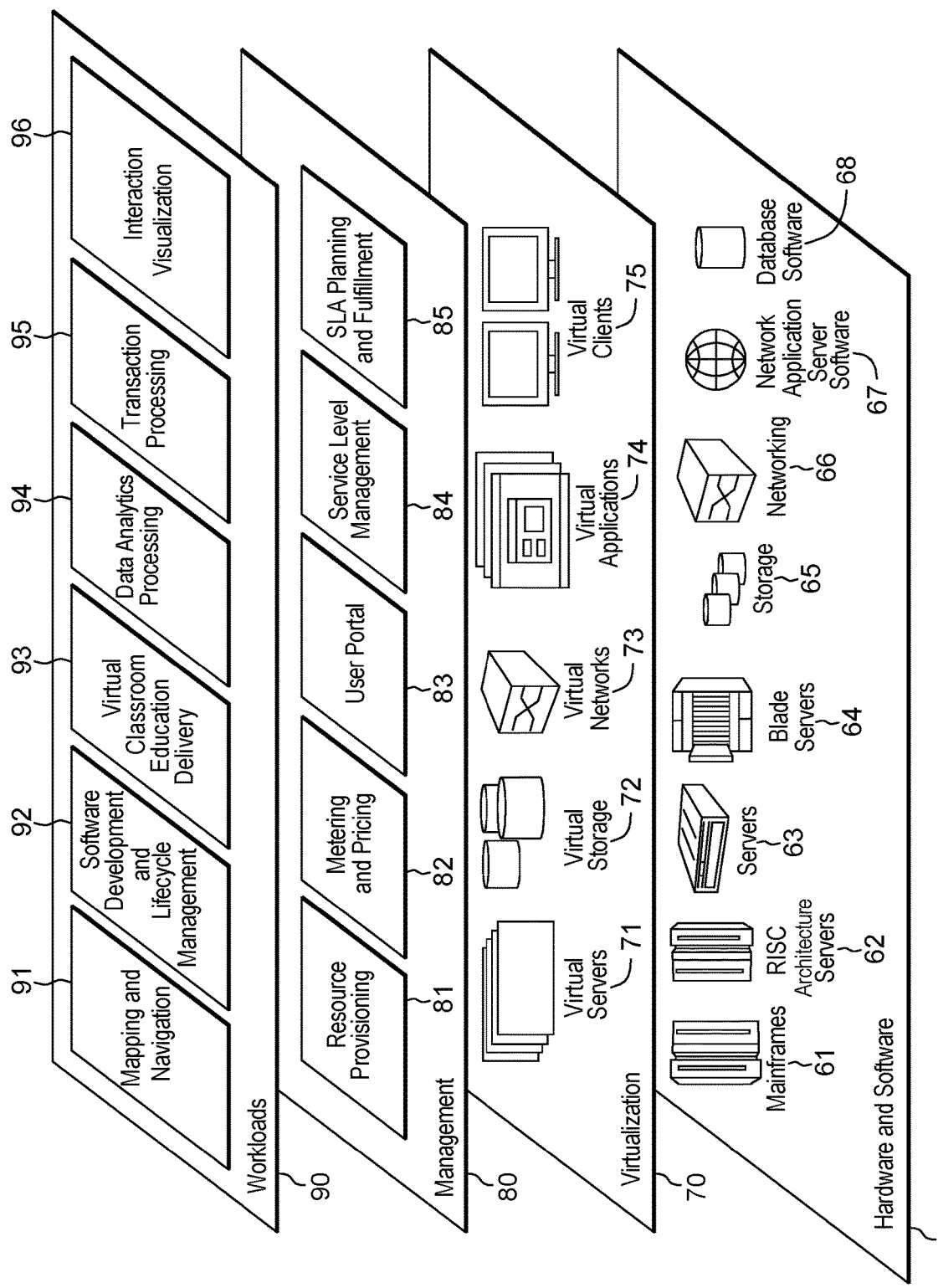
FIG. 17 depicts abstraction model layers according to an embodiment of the present invention.

Referring now to FIG. 17, a set of functional abstraction layers provided by cloud computing environment 50 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interaction visualization 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
building and providing a graphical user interface (GUI) of graphical elements for display on a display device, the graphical elements presenting (i) visualizations of user interactions between users and an interactive computing platform in progression of the users through tasks based on the user interactions and (ii) identified features of the user interactions relative to the tasks and progression of the users therethrough, wherein the building and providing comprises:
for each of the tasks, building and providing a respective task element that reflects identified features of a set of user interactions of one or more users in progressing through that task, wherein building a task element for a task comprises building the task element as a polygon having vertices corresponding to subtasks of the task and edges between the vertices.

2. The computer-implemented method of claim 1, further comprising identifying a plurality of features of user interactions, of the set of user interactions, of at least one user in progressing the at least one user from one subtask of the task to a sequentially-next subtask of the task, and wherein building the task element comprises building an edge between a first vertex corresponding to the one subtask and a second vertex corresponding to the sequentially-next subtask of the task, the edge including at least one graphical element corresponding to each feature of the plurality of features of the user interactions of the at least one user.

3. The computer-implemented method of claim 2, wherein the identified plurality of features comprises classified interaction types of the user interactions of the at least one user, and wherein the building the edge further comprises providing, as part of the edge, a respective at least one graphical element corresponding to each classified interaction type of the classified interaction types.

4. The computer-implemented method of claim 3, wherein the identified plurality of features further comprises identified positive user interactions and negative user interactions of the user interactions of the at least one user, and wherein the building the edge further comprises:
providing a first one or more graphical elements representing the positive user interactions on a first side of an edge line between the first vertex and the second vertex;
providing a second one or more graphical elements representing the negative user interactions on a second side of the edge line between the first vertex and the second vertex.

5. The computer-implemented method of claim 2, wherein the building and providing the GUI further comprises building and providing with the task element an interval indicator specific to the task, the interval indicator presenting a visualization of interval information of the at least one user in progressing through the task, the interval information comprising discrete intervals of one or more measured properties of the progression by the at least one user through the task, the one or more measured properties being at least one selected from the group consisting of: turns, sessions, and time taken by the at least one user in progressing through the task.

6. The computer-implemented method of claim 1, wherein the building and providing the GUI comprises building, between a first task element corresponding to a first task of the tasks and a second task element corresponding to a second task of the tasks, an edge and one or more graphical elements representing user experience with the second task after progressing from the first task.

7. The computer-implemented method of claim 1, wherein the interactive computing platform comprises an interactive learning platform providing a chat agent with which the users interact to provide the user interactions, and wherein the tasks represent learning objectives for the users.

8. The computer-implemented method of claim 1, further comprising, based on interaction by a GUI user with an interactive graphical element of the GUI to select at least one selected from the group consisting of (i) one or more feature types of the identified features and (ii) a task element corresponding to a task of the tasks, updating the GUI to change the graphical elements presenting visualizations of the user interactions and the identified features thereof.

9. The computer-implemented method of claim 1, wherein a plurality of possible task traversal paths exist through which the users can progress through the tasks, wherein the computer-implemented method further comprises receiving a selection, by a GUI user, of a selected task traversal path of the plurality of possible task traversal paths, wherein the visualizations presented by the graphical elements in the GUI reflect user interactions, and the identified features thereof, that include the user interactions of a first set of users who progressed through the tasks along the selected task traversal path and exclude the user interactions of a second set of users who progressed through the tasks along any other task traversal path different than the selected task traversal path, wherein the respective task element for each of the tasks reflects identified features of user interactions that include the user interactions of the first set of users in progressing through that task and excludes the user interactions of the second set of users in progressing through that task.

10. A computer system comprising:
a memory; and
a processor in communication with the memory, wherein the computer system is configured to perform a method comprising:
building and providing a graphical user interface (GUI) of graphical elements for display on a display device, the graphical elements presenting (i) visualizations of user interactions between users and an interactive computing platform in progression of the users through tasks based on the user interactions and (ii) identified features of the user interactions relative to the tasks and progression of the users therethrough, wherein the building and providing comprises:
for each of the tasks, building and providing a respective task element that reflects identified features of a set of user interactions of one or more users in progressing through that task, wherein building a task element for a task comprises building the task element as a polygon having vertices corresponding to subtasks of the task and edges between the vertices.

11. The computer system of claim 10, wherein the method further comprises identifying a plurality of features of user interactions, of the set of user interactions, of at least one user in progressing by the at least one user from one subtask of the task to a sequentially-next subtask of the task, and wherein building the task element comprises building an edge between a first vertex corresponding to the one subtask and a second vertex corresponding to the sequentially-next subtask of the task, the edge including at least one graphical element corresponding to each feature of the plurality of features of the user interactions of the at least one user.

12. The computer system of claim 11, wherein the identified plurality of features comprises classified interaction types of the user interactions of the at least one user, and wherein the building the edge further comprises providing, as part of the edge, a respective at least one graphical element corresponding to each classified interaction type of the classified interaction types.

13. The computer system of claim 12, wherein the identified plurality of features further comprises identified positive user interactions and negative user interactions of the user interactions of the at least one user, and wherein the building the edge further comprises:
providing a first one or more graphical elements representing the positive user interactions on a first side of an edge line between the first vertex and the second vertex;
providing a second one or more graphical elements representing the negative user interactions on a second side of the edge line between the first vertex and the second vertex.

14. The computer system of claim 10, wherein the building and providing the GUI further comprises building and providing with the task element an interval indicator specific to the task, the interval indicator presenting a visualization of interval information of the at least one user in progressing through the task, the interval information comprising discrete intervals of one or more measured properties of the progression by the at least one user through the task, the one or more measured properties being at least one selected from the group consisting of: turns, sessions, and time taken by the at least one user in progressing through the task.

15. A computer program product comprising:
a computer readable storage medium readable by a processing circuit and storing instructions for execution by the processing circuit for performing a method comprising:
building and providing a graphical user interface (GUI) of graphical elements for display on a display device, the graphical elements presenting (i) visualizations of user interactions between users and an interactive computing platform in progression of the users through tasks based on the user interactions and (ii) identified features of the user interactions relative to the tasks and progression of the users therethrough, wherein the building and providing comprises:
for each of the tasks, building and providing a respective task element that reflects identified features of a set of user interactions of one or more users in progressing through that task, wherein building a task element for a task comprises building the task element as a polygon having vertices corresponding to subtasks of the task and edges between the vertices.

16. The computer program product of claim 15, wherein the method further comprises identifying a plurality of features of user interactions, of the set of user interactions, of at least one user in progressing the at least one user from one subtask of the task to a sequentially-next subtask of the task, and wherein building the task element comprises building an edge between a first vertex corresponding to the one subtask and a second vertex corresponding to the sequentially-next subtask of the task, the edge including at least one graphical element corresponding to each feature of the plurality of features of the user interactions of the at least one user.

17. The computer program product of claim 16, wherein the identified plurality of features comprises classified interaction types of the user interactions of the at least one user, and wherein the building the edge further comprises providing, as part of the edge, a respective at least one graphical element corresponding to each classified interaction type of the classified interaction types.

18. The computer program product of claim 17, wherein the identified plurality of features further comprises identified positive user interactions and negative user interactions of the user interactions of the at least one user, and wherein the building the edge further comprises:

providing a first one or more graphical elements representing the positive user interactions on a first side of an edge line between the first vertex and the second vertex;

providing a second one or more graphical elements representing the negative user interactions on a second side of the edge line between the first vertex and the second vertex.

19. The computer program product of claim 15, wherein the building and providing the GUI further comprises building and providing with the task element an interval indicator specific to the task, the interval indicator presenting a visualization of interval information of the at least one user in progressing through the task, the interval information comprising discrete intervals of one or more measured properties of the progression by the at least one user through the task, the one or more measured properties being at least one selected from the group consisting of: turns, sessions, and time taken by the at least one user in progressing through the task.

* * * * *